US008731255B2

(12) United States Patent
El-Baz

(10) Patent No.: US 8,731,255 B2
(45) Date of Patent: May 20, 2014

(54) COMPUTER AIDED DIAGNOSTIC SYSTEM INCORPORATING LUNG SEGMENTATION AND REGISTRATION

(75) Inventor: Ayman S. El-Baz, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 1045 days.

(21) Appl. No.: 12/613,000

(22) Filed: Nov. 5, 2009

(65) Prior Publication Data

US 2010/0111386 A1 May 6, 2010

Related U.S. Application Data

(60) Provisional application No. 61/111,460, filed on Nov. 5, 2008.

(51) Int. Cl.
*G06K 9/00* (2006.01)
*G06K 9/68* (2006.01)

(52) U.S. Cl.
USPC .......................................... 382/128; 382/131

(58) Field of Classification Search
USPC .................... 705/2–3; 382/128, 131; 600/407
See application file for complete search history.

(56) References Cited

U.S. PATENT DOCUMENTS

| | | | |
|---|---|---|---|
| 2005/0002548 A1* | 1/2005 | Novak et al. | 382/128 |
| 2005/0251021 A1* | 11/2005 | Kaufman et al. | 600/407 |
| 2010/0220921 A1* | 9/2010 | Blake et al. | 382/154 |
| 2010/0272341 A1* | 10/2010 | Reeves et al. | 382/131 |
| 2011/0255761 A1* | 10/2011 | O'Dell et al. | 382/131 |

OTHER PUBLICATIONS

Zaidi et al., PET-guided delineation of radiation therapy treatment volumes: a survey of image segmentation techniques, Mar. 25, 2010, European Journal of Nuclear Medicine and Molecular Imaging, pp. 2165-2187.*

Farag, Aly A.; Ei-Baz, Ayman S., and Gimel'farb, Gregory, "Precise Segmentation of Multimodal Images," IEEE Transactions on Image Processing, vol. 15, No. 4, Apr. 2006.

Maurer Jr., Calvin R.; Maciunas, Robert J.; and Fitzpatrick, J. Michael, "Registration of Head CT Images to Physical Space Using a Weighted Combination of Points and Surfaces," IEEE Transactions on Medical Imaging, vol. 17, No. 5, Oct. 1998.

(Continued)

*Primary Examiner* — Luke Gilligan
(74) *Attorney, Agent, or Firm* — Wood, Herron & Evans, LLP

(57) ABSTRACT

A computer aided diagnostic system and automated method diagnose lung cancer through tracking of the growth rate of detected pulmonary nodules over time. The growth rate between first and second chest scans taken at first and second times is determined by segmenting out a nodule from its surrounding lung tissue and calculating the volume of the nodule only after the image data for lung tissue (which also includes image data for a nodule) has been segmented from the chest scans and the segmented lung tissue from the chest scans has been globally and locally aligned to compensate for positional variations in the chest scans as well as variations due to heartbeat and respiration during scanning. Segmentation may be performed using a segmentation technique that utilizes both intensity (color or grayscale) and spatial information, while registration may be performed using a registration technique that registers lung tissue represented in first and second data sets using both a global registration and a local registration to account for changes in a patient's orientation due in part to positional variances and variances due to heartbeat and/or respiration.

26 Claims, 12 Drawing Sheets

(56) References Cited

OTHER PUBLICATIONS

Okada, Kazunori; Comaniciu, Dorin; and Krishnan, Arun, "Robust Anisotropic Gaussian Fitting for Volumetric characterization of Pulmonary Nodules in Multislice CT," IEEE Transactions on Medical Imaging, vol. 24, No. 3, Mar. 2005.

Kostis, William J.; Reeves, Anthony P.; Yankelevitz, David F.; and Henschke, Cladia I., "Three-Dimensional Segmentation and Growth-Rate Estimation of Small Pulmonary Nodules in Helical CT Images," IEEE Transactions on Medical Imaging, vol. 22, No. 10, Oct. 2003.

Reeves, Anthony P.; Chan, Antoni B.; Yankelevitz, David F.; Henschke, Claudia L; Kressler, Bryan; and Kostis, William J., "On Measuring the Change in Size of Pulmonary Nodules," IEEE Transactions on Medical Imaging, vol. 25, No. 4, Apr. 2006.

El-Baz, A.; Gimel'farb, G.; Falk, R.; and El-Ghar, M. Abo, Automatic analysis of 3D low dose CT images for early diagnosis of lung cancer, Pattern Recognition 42 (2009) (1041-1051).

\* cited by examiner

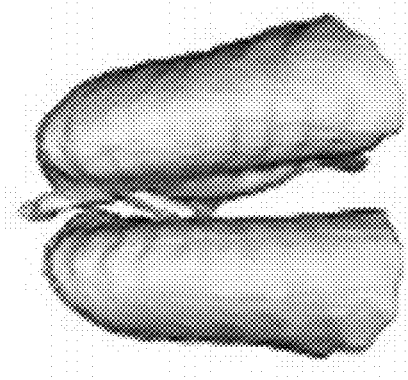
FIG. 9C FIG. 9B FIG. 9A
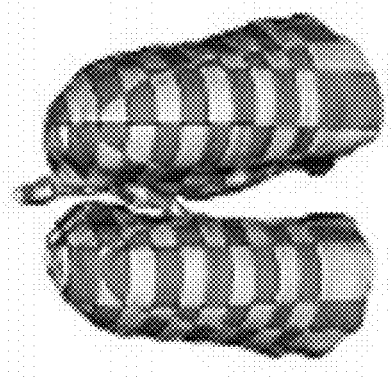
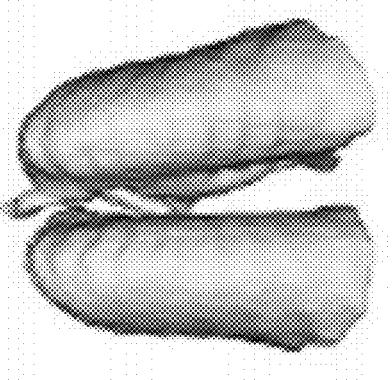
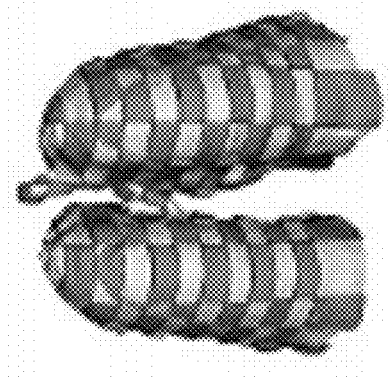
FIG. 9F FIG. 9E FIG. 9D

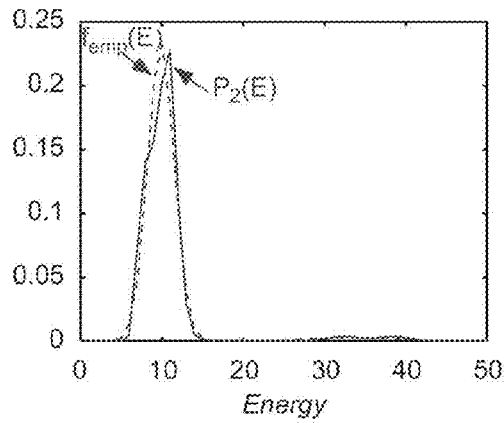
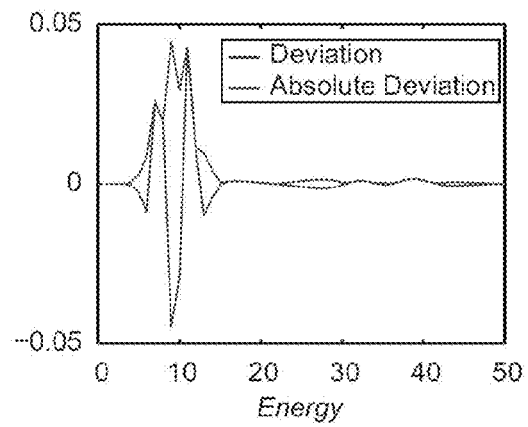
FIG. 12A   FIG. 12B
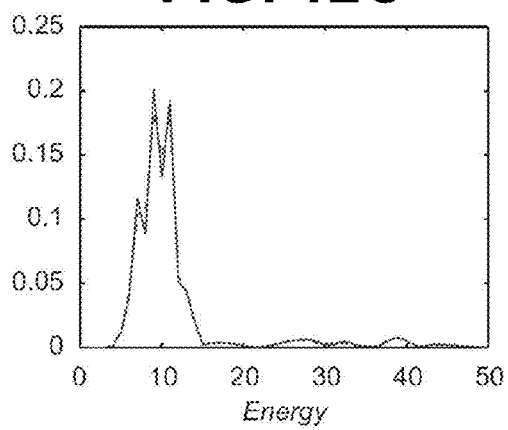
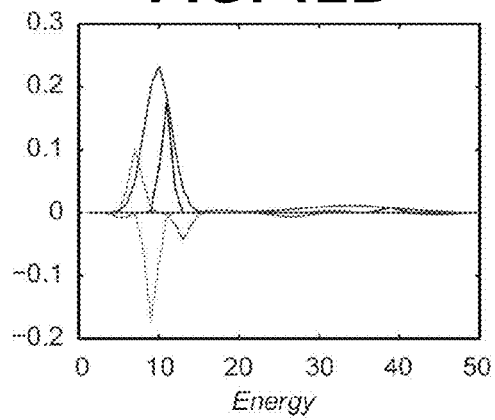
FIG. 12C   FIG. 12D
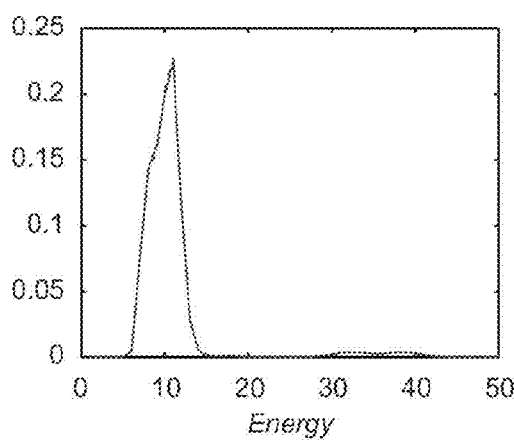
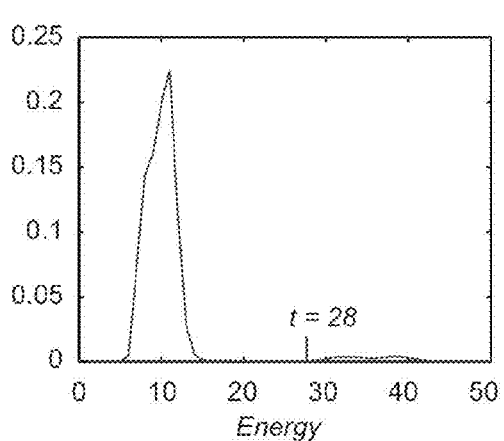
FIG. 12E   FIG. 12F

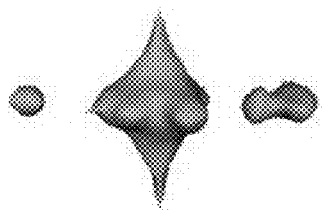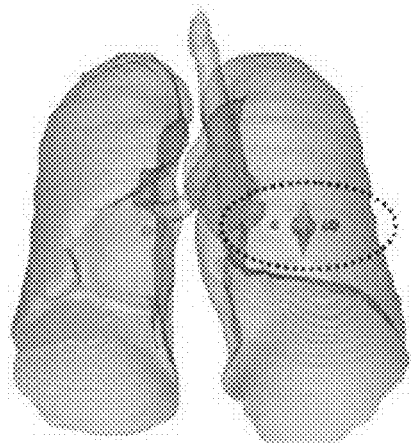
FIG. 13A   FIG. 13B
FIG. 13C
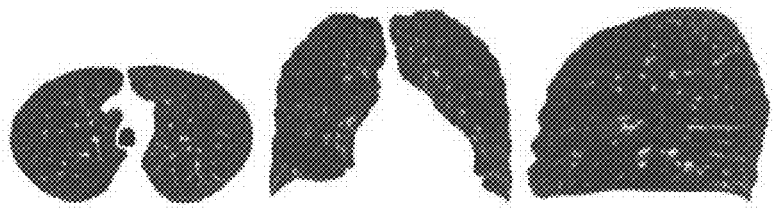
FIG. 14A
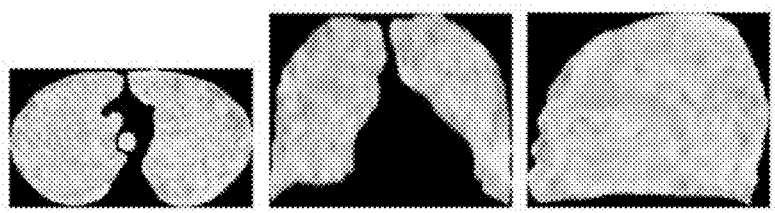
FIG. 14B
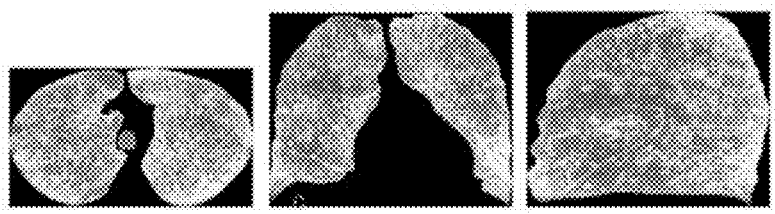
FIG. 14C
A   C   S

COMPUTER AIDED DIAGNOSTIC SYSTEM INCORPORATING LUNG SEGMENTATION AND REGISTRATION

CROSS-REFERENCE TO RELATED APPLICATIONS

This invention claims the benefit of priority of U.S. Provisional Application Ser. No. 61/111,460, filed on Nov. 5, 2008, which is incorporated by reference herein in its entirety.

FIELD OF THE INVENTION

The invention is generally related to computer analysis of medical image data, and in particular to the segmentation and registration of image data, e.g., low dose computed tomography (LDCT) chest scans.

BACKGROUND OF THE INVENTION

Lung cancer remains the leading cause of mortality cancer. In 1999, there were approximately 170,000 new cases of lung cancer in the U.S., where approximately one in every eighteen women and approximately one in every twelve men develop lung cancer. Early detection of lung tumors (visible on chest film as pulmonary nodules) may increase the patient's chance of survival, but detecting pulmonary nodules is a complicated task. Nodules show up as relatively low-contrast white circular objects within the lung fields. The difficulty for computer aided image data search schemes is distinguishing true nodules from (overlapping) shadows, vessels and ribs.

The early stage detection of lung cancer remains an important goal in medical research. Regular chest radiography and sputum examination programs have proven ineffective in reducing mortality rates. Although screening for lung cancer with chest X-rays can detect early lung cancer, such screening can also possibly produce many false-positive test results, causing needless extra tests. Furthermore, while large (e.g., greater than 1 cm in diameter) malignant nodules are often relatively easy to detect with conventional screening equipment and can be diagnosed with needle biopsy or bronchoscopy techniques, these techniques are typically unsuitable for detecting smaller nodules, particularly if such nodules are located deep in the lung tissue or away from large airways. Thus, many of these techniques have been found to be unsuitable for early stage lung cancer detection.

At present, low-dose spiral computed tomography (LDCT) is of prime interest for screening (high risk) groups for early detection of lung cancer and is being studied by various groups, including the National Cancer Institute. LDCT provides chest scans with very high spatial, temporal, and contrast resolution of anatomic structures and is able to gather a complete 3D volume of a human thorax in a single breath-hold. Hence, for these reasons, in recent years most lung cancer screening programs are being investigated in the United States and Japan with LDCT as the screening modality of choice.

Automatic screening of image data from LDCT typically involves selecting initial candidate lung abnormalities (pulmonary nodules). Next, the false candidates, called false positive nodules (FPNs), are partially eliminated while preserving the true positive nodules (TPNs).

When selecting initial candidates, conformal nodule filtering or unsharp masking can enhance nodules and suppress other structures to separate the candidates from the background by simple thresholding or multiple gray-level thresholding techniques. A series of 3D cylindrical and spherical filters may be used to detect small lung nodules from high resolution CT images. Circular and semicircular nodule candidates may be detected by template matching. However, these spherical, cylindrical, or circular assumptions are typically not adequate for describing the general geometry of the lesions. This is because their shape can be irregular due to the spiculation or the attachments to the pleural surface (i.e., juxtapleural and peripheral) and vessels (i.e., vascularized). Morphological operators may be used to detect lung nodules. The drawbacks to these approaches are the difficulties in detecting lung wall nodules. Also, there are other pattern recognition techniques used in detection of lung nodules such as clustering, linear discriminant functions, rule-based classification, Hough transforms, connected component analysis of thresholded CT slices, gray level distance transforms, and patient-specific a priori models.

FPNs may be excluded by feature extraction and classification. Such features as circularity, size, contrast, or local curvature that are extracted by morphological techniques, or artificial neural networks (ANN), may be used as post-classifiers. Also, there are a number of classification techniques used in the final stage of some nodule detection systems to reduce the FPNs such as: rule-based or linear classifiers; template matching; nearest cluster; and Markov random field.

Two specific issues arising in connection with pulmonary nodule detection include image segmentation and registration. Image segmentation refers to the extraction of relevant image data from an image, e.g., in the context of pulmonary nodule detection, segmenting the lung tissues from an LDCT chest scan, or segmenting pulmonary nodules and/or candidates from surrounding lung tissues.

Image segmentation is under extensive study. Typical conventional techniques are based on fitting a Gaussian model to empirical data, but this approach becomes a challenge if initial measurements are corrupted with outliers and margin-truncation from neighboring structures. Some techniques to address segmentation include the use of anisotropic intensity model fitting with analytical parameter estimation. Other techniques segment 2D and 3D nodules based on thresholding voxel intensity; however, such attempts may be unreliable on cavity or non-solid nodules.

Therefore, a need exists in the art for an improved image segmentation technique for segmenting lung tissues from LDCT image scans.

Image registration refers to the alignment of multiple images for the purpose of detecting changes from one image to another. Within the context of pulmonary nodule detection, it has been found that one promising technique for detecting small cancerous nodules is based upon the growth rate of such nodules, as malignant nodules have been found to exhibit significantly higher rates of growth than benign nodules.

Image registration is an important step in tracking the growth of nodules over time, as growth is typically measured by comparing the size or volume of the nodules at two different points in time, i.e., by comparing the image data for the nodules taken at two points in time. Tracking growth from image data, however, can be a challenging task not only because of changes in a patient's position at each data acquisition, but also because of a patient's heartbeat and respiration during data acquisition. In order to accurately measure how nodules are developing over time, all of these motions need to be compensated for by registering LDCT data sets taken at different times.

Conventional approaches to register LDCT scans with one another typically exploit corresponding local structural elements or features in the images, e.g., using the centroids of local structures to apply rigid and affine image registration, using an objective function with an anisotropic smoothness constraint and a continuous mechanical model, using an optical flow and model based motion estimation technique, combining optical flow analysis with spirometric data in order to track breathing motion automatically, using a standard lung atlas to analyze pulmonary structures, exploiting landmark and intensity based registration algorithms to warp a template image to a lung volume, using an anisotropic intensity model fitting with analytical parameter estimation to evaluate nodule volume, or segmenting 2D and 3D nodules by thresholding voxel intensity followed by a connectivity filter.

Conventional approaches, however, have been found to inadequately account for large deformations of lung tissues due to heartbeat and respiration. Furthermore, these approaches have been found to not be suitable for some types of pulmonary nodules such as cavities and ground glass nodules, and many approaches require significant user interaction, which can be problematic in clinical settings.

Therefore, a need also exists in the art for an improved image registration technique in connection with monitoring the growth of pulmonary nodules from LDCT scans.

SUMMARY OF THE INVENTION

The invention addresses these and other problems associated with the prior art by providing a computer aided diagnostic system and automated method for diagnosing lung cancer through tracking of the growth rate of detected pulmonary nodules over time. Embodiments consistent with the invention determine the growth rate between first and second chest scans taken at first and second times by segmenting out a nodule from its surrounding lung tissue and calculating the volume of the nodule only after the image data for lung tissue (which also includes image data for a nodule) has been segmented from the chest scans and the segmented lung tissue from the chest scans has been globally and locally aligned to compensate for positional variations in the chest scans as well as variations due to heartbeat and respiration during scanning. By doing so, the change in volume of a nodule between the two chest scans can be more accurately obtained.

Consistent with one aspect of the invention, therefore, the growth of a pulmonary nodule may be detected by receiving first and second chest scans generated at first and second times, respectively, determining a location of a pulmonary nodule in image data from at least one of the first and second chest scans, segmenting image data associated with lung tissue from each of the first and second chest scans, registering the segmented image data associated with the lung tissue from the first and second chest scans by performing a global alignment and thereafter performing a local alignment, segmenting image data associated with the pulmonary nodule from the registered and segmented image data associated with the lung tissue from the first and second chest scans, and determining a volumetric change for the pulmonary nodule between the first and second chest scans using the segmented image data associated with the pulmonary nodule from the first and second chest scans.

In addition, in order to accurately calculate the volume of nodules, as is required in order to track growth rate, embodiments of the invention rely on an improved lung segmentation technique and an improved lung registration technique to provide a reliable and accurate estimation of nodule growth rate over time. For example, a computer aided diagnostic system consistent with the invention may incorporate a segmentation technique that utilizes both intensity (color or grayscale) and spatial information. The combination of a Linear Combination of Discrete Gaussians (LCDG) model, which includes both positive and negative components, and a Markov Gibbs Random Field (MGRF) model, may be used to segment image data for lung tissue from the image data for the surrounding chest cavity in one or more images generated from a chest scan. An iterative process that relies on both models may then be performed, whereby an initial segmentation for the lung tissue is generated after estimating marginal density for the lung tissue using the LCDG model, and thereafter spatial interaction parameters for the MGRF model are estimated and used along with the LCDG model to refine the initial segmentation. Of note, the herein-described segmentation technique may have applicability in applications other than lung segmentation of LDCT images, and thus may be used in connection with segmenting other types of anatomical structures from other types of medical image data.

Therefore, consistent with another aspect of the invention, an anatomical structure may be segmented from medical image data by estimating marginal density for the anatomical structure using a Linear Combination of Discrete Gaussians (LCDG) model having positive and negative components, generating an initial segmentation for the anatomical structure from the LCDG model, estimating spatial interaction parameters for a Markov Gibbs Random Field (MGRF) model, and refining the initial segmentation for the anatomical structure using the LCDG model and the MGRF model.

In addition, a computer aided diagnostic system consistent with the invention may incorporate a registration technique that registers lung tissue represented in first and second data sets (e.g., in LDCT image data sets generated from chest scans taken at two points in time) using both a global registration and a local registration to account for changes in a patient's orientation due in part to positional variances and variances due to heartbeat and/or respiration. The registration technique performs such global and local registrations in the Gibbs energy domain, such that the global and local registrations attempt to match Gibbs energies between the lung tissue represented in the two data sets. The global registration includes an affine translation that maximizes Gibbs energy, while the local registration attempts to deform and match respective iso-surfaces (i.e., equispaced closed surfaces) generated for the first and second data sets, also within the Gibbs energy domain. Of note, the herein-described registration technique may have applicability in applications other than registering lung tissue in LDCT images, and thus may be used in connection with registering other types of anatomical structures from other types of medical image data.

Therefore, consistent with another aspect of the invention, first and second medical image data, e.g., first and second data sets of LDCT images taken at two different points in time, may be registered by transforming the first and second medical image data to a Gibbs energy domain, performing a global alignment of the first and second medical image data using an affine translation that maximizes Gibbs energy, and after performing the global alignment, performing a local alignment of the first and second medical image data by matching iso-surfaces generated for the first and second medical image data based on Gibbs energy.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a block diagram of a joint Markov-Gibbs model of LDCT lung images.

FIGS. 9A-9F are three dimensional illustrations of lung tissue data sets and illustrating the registration process of FIG. 8, where FIG. 9A is a reference data set, FIG. 9B is a target data set, FIG. 9C is the target data set after global alignment, FIG. 9D is a checkerboard visualization of the globally aligned target data set overlaid on the reference data set, FIG. 9E is the target data set after local alignment, and FIG. 9F is a checkerboard visualization of the locally aligned target data set overlaid on the reference data set.

FIG. 12A is a graph of empirical energy distribution $f_{emp}(E)$ and the estimated mixture of two dominant Gaussians $P_2(E)$ representing low- and high-energy distributions, FIG. 12B is a graph of sign-alternate and absolute deviations between the $f_{emp}(E)$ and $P_2(E)$, FIG. 12C is a graph of a mixture model estimate of the absolute deviations, FIG. 12D is a graph of the resulting positive and negative components of the LCDG, FIG. 12E is a graph of a final LCDG that approximates the empirical distribution, and FIG. 12F is a graph of two estimated weighed energy distributions $\pi P_{lo}(E)$ and $(1-\pi)P_{hi}(E)$.

FIG. 13A illustrates a 3D system estimated for lung tissues.

FIG. 13B illustrates a 2D cross-section of the 3D system of FIG. 13A in the plane $\xi=0$ (in white).

FIG. 13C illustrates the superposition of the 3D neighborhood system of FIG. 13A onto a 3D model of the lungs reconstructed from LDCT images.

FIG. 14A illustrates exemplary LDCT images of lung tissue taken in axial (A), coronal (C) and saggital (S) planes.

FIG. 14B illustrates 3D voxelwise Gibbs energies projected onto 2D axial (A), coronal (C) and saggital (S) planes of the LDCT images of FIG. 14A using a neighborhood system with 275 characteristic neighbors.

FIG. 14C illustrates 3D voxelwise Gibbs energies projected onto 2D axial (A), coronal (C) and saggital (S) planes of the LDCT images of FIG. 14A using a neighborhood system with 3927 characteristic neighbors.

DETAILED DESCRIPTION

Automatic diagnosis of pulmonary nodules for early detection of lung cancer is the goal of a number of screening studies worldwide. With improvements in resolution and scanning time of low dose chest CT (LDCT) scanners, nodule detection and identification is continuously improving. Embodiments consistent with the invention provide techniques for lung segmentation and registration in image data in connection with nodule detection and identification.

Embodiments consistent with the invention provide for automated diagnosis of lung cancer principally through tracking of the growth rate of detected pulmonary nodules over time, as higher growth rates have been found to be a discriminant between malignant nodules and benign nodules. Embodiments consistent with the invention determine the growth rate between first and second chest scans taken at first and second times by segmenting out a nodule from its surrounding lung tissue and calculating the volume of the nodule only after the image data for lung tissue (which also includes image data for a nodule) has been segmented from the chest scans and the segmented lung tissue from the chest scans has been globally and locally aligned to compensate for positional variations in the chest scans as well as variations due to heartbeat and respiration during scanning. By doing so, the change in volume of a nodule between the two chest scans can be more accurately obtained.

As discussed in greater detail below, in order to accurately calculate the volume of nodules, as is required in order to track growth rate, some embodiments of the invention may rely on lung segmentation and/or lung registration techniques disclosed herein in order to provide a reliable and accurate estimation of nodule growth rate over time. It will be appreciated, however, that the lung segmentation and lung registration techniques may find applicability in other applications, and may be utilized individually in some applications.

Therefore, the lung segmentation and lung registration techniques disclosed herein are not limited to use in the herein-described growth rate-based lung cancer diagnostic process.

Figure 1:
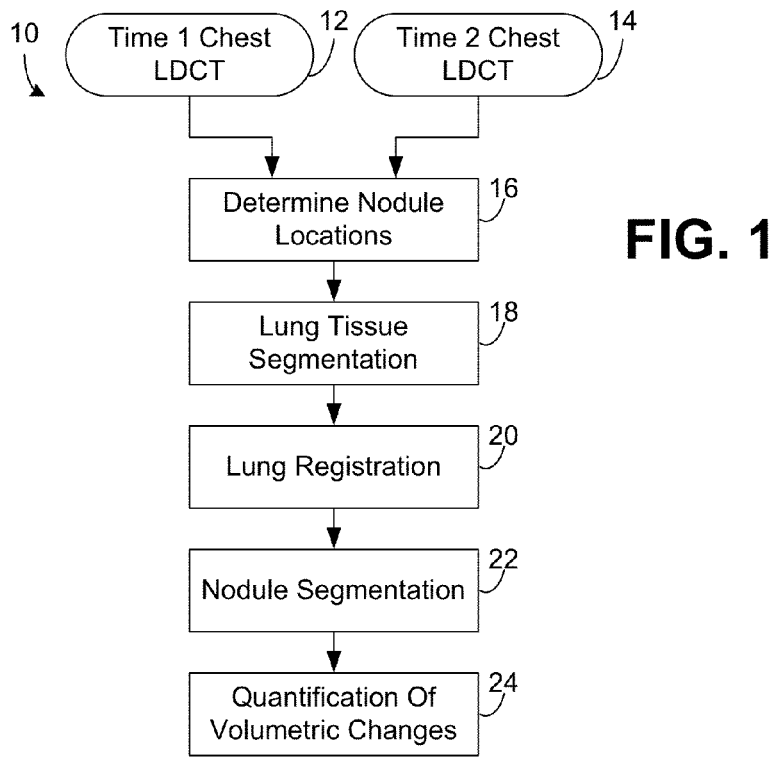
FIG. 1 is a flowchart of an automated lung cancer diagnostic process consistent with the invention.

Now turning to the Drawings, wherein like numbers denote like parts throughout the several views, FIG. 1 illustrates an exemplary automated process 10 for early diagnosis of lung cancer consistent with the invention. Process 10 in particular is based upon the diagnosis of lung cancer via the detection of the growth rate of pulmonary nodules in low dose CT (LDCT) images. Process 10 receives as input two LDCT chest scans 12, 14, and begins by determining the locations of one or more nodules in one or both of the chest scans 12, 14 in block 16. A chest scan, within the context of the invention, typically includes one or more two dimensional "slices" of image data generated from a medical imaging device such as a CT scanner, an MRI imager, or other medical imaging device.

The determination of nodule location may be made manually by an expert, e.g., a radiologist, or may be made automatically via a computer aided diagnostic technique. Typically, only the first chest scan 12 need have the nodule locations identified, as in many instances, the second chest scan 14 is generated weeks or months later after a nodule of concern was identified in the first chest scan 14. In some embodiments, for example, process 10 is performed after a patient has had an initial screening at a first time in which a nodule of concern was found, and the patient has been instructed to return for a follow-up screening at a second time to determine the growth rate of any identified nodules, and thus whether any such nodules are potentially malignant in nature.

Next, the lung tissues are segmented from the respective LDCT chest scans 12, 14 in block 18, using the lung segmentation technique disclosed in greater detail hereinafter, or using another lung segmentation algorithm known in the art.

Thereafter, the segmented image data associated with the lung tissue in each chest scan 12, 14 is registered in block 20 to properly align the respective images by correcting for both global and local misalignment due to patient position, heartbeat and respiration. 3D nodule segmentation is then performed in block 22 to extract the image data for the nodule(s) from the segmented and registered lung tissue image data, followed by quantification of the volumetric changes for each nodule between the respective chest scans 12, 14.

As will become more apparent below, the degree of volumetric changes in a nodule is believed to be a factor in the malignancy of the nodule, and is thus an early indicator of lung cancer. In addition, it is believed that by segmenting lung tissues from chest scans and then aligning the respective segmented lung tissues from the chest scans together prior to segmenting out the nodules from the chest scans, rather than segmenting nodules from chest scans without prior lung segmentation and registration as has conventionally been performed, a more accurate estimation of growth rate can be obtained.

Figure 2:
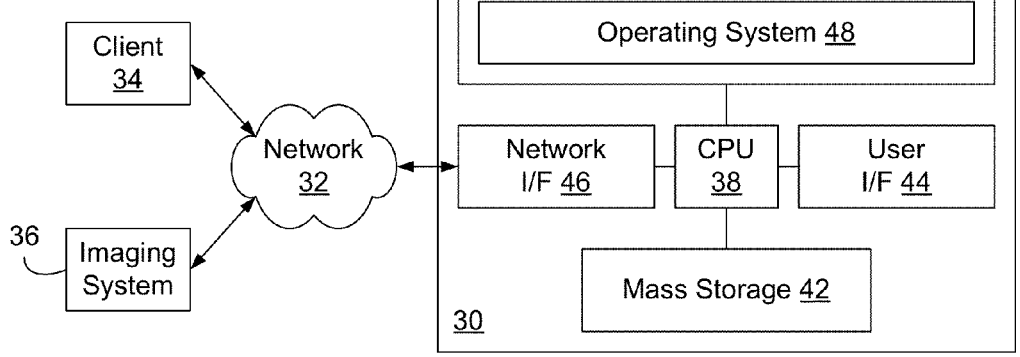
FIG. 2 is a block diagram of an exemplary apparatus suitable for implementing steps from the process of FIG. 1.

As noted above, one or more steps in process 10 may be implemented in an automated fashion, utilizing a computer or other electronic device to implement such steps. FIG. 2, for example, illustrates an exemplary apparatus 30 within which various steps from process 10 may be implemented in a manner consistent with the invention. Apparatus 30 in the illustrated embodiment is implemented as a server or multi-user computer that is coupled via a network 32 to one or more client computers 34, as well as an imaging system 36, e.g., a helical or multi-slice LDCT scanner. For the purposes of the invention, each computer 30, 34 may represent practically any type of computer, computer system or other programmable electronic device. Moreover, each computer 30, 34 may be implemented using one or more networked computers, e.g., in a cluster or other distributed computing system. In the alternative, computer 30 may be implemented within a single computer or other programmable electronic device, e.g., a desktop computer, a laptop computer, a handheld computer, a cell phone, a set top box, etc.

Computer 30 typically includes a central processing unit 38 including at least one microprocessor coupled to a memory 40, which may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 40 may be considered to include memory storage physically located elsewhere in computer 30, e.g., any cache memory in a processor in CPU 38, as well as any storage capacity used as a virtual memory, e.g., as stored on a mass storage device 42 or on another computer coupled to computer 30. Computer 30 also typically receives a number of inputs and outputs for communicating information externally. For interface with a user or operator, computer 30 typically includes a user interface 44 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 30 may also include one or more mass storage devices 42, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface 46 with one or more networks 32 (e.g., a LAN, a WAN, a wireless network, and/or the Internet, among others) to permit the communication of information with other computers and electronic devices. It should be appreciated that computer 30 typically includes suitable analog and/or digital interfaces between CPU 36 and each of components 40, 42, 44 and 46 as is well known in the art. Other hardware environments are contemplated within the context of the invention.

Computer 30 operates under the control of an operating system 48 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 30 via network 32, e.g., in a distributed or client-server computing environment, whereby the processing required to implement the functions of a computer program may be allocated to multiple computers over a network.

As an example, computer 30 may include a computer aided diagnostic (CAD) system program 50 used to implement one or more of the steps described above in connection with process 10. For the purposes of implementing such steps, an image database 52, storing LDCT chest scan images, may be implemented in computer 30. It will be appreciated, however, that some steps in process 10 may be performed manually and with or without the use of computer 30.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, tangible storage media such as volatile and non-volatile memory devices, floppy and other removable disks, hard disk drives, magnetic tape, optical disks (e.g., CD-ROMs, DVDs, etc.), among others, and transmission media such as digital and analog communication links.

In addition, various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Each of the aforementioned steps in process 10 will now be discussed in greater detail below. It will be appreciated, however, that process 10 may incorporate other steps and/or may omit some steps, and as such, the invention is not limited to the specific steps disclosed herein.

Nodule Identification

As noted above, process 10 typically begins by identifying nodules in one or more LDCT chest scans in block 16. Nodule identification may be performed by an expert such as a radiologist inspecting the LDCT image data, or may be performed automatically by apparatus 30 via image processing of the LDCT image data. Nodule identification may be performed, for example, using the techniques disclosed in U.S. Published application No. 2008-0002870, U.S. Ser. No. 11/824,669, which was filed on Jul. 7, 2007, or in A. Farag, A. El-Baz, G. Gimel'farb, "Quantitative nodule detection in low dose chest CT scans: new template modeling and evaluation for CAD system design," Proceedings of the International Conference on Medical Image Computing and Computer-Assisted Intervention (MICCAI'05), Palm Springs, Calif., USA, Oct. 26-29, 2005, pp. 720-728, both of which are incorporated by reference herein.

As a result of nodule identification, the location of one or more nodules to be tracked for volumetric changes is identified and stored. For example, a set of coordinates, representing a point in 3D space, may be stored for each identified nodule. Typically, the nodule locations need by identified in a first chest scan (i.e., the chest scan that is first in time); however, in other embodiments nodule locations may be identified in both chest scans, or only in a later in time chest scan. The invention is therefore not limited to identifying nodules only in a first in time chest scan.

Lung Segmentation

After nodules have been identified in at least one of the chest scans, a segmentation technique is performed in block 18 of process 10. Segmentation techniques consistent with the invention attempt to accurately segment the lung tissues from the background in such a way that the lung borders approach closely the "ground truth" borders outlined by a radiologist. Segmentation of lung tissues from LDCT images is a challenging problem because some lung tissues such as arteries, veins, bronchi, and bronchioles are very similar to chest tissues in terms of grayness or intensity. As such, it has been found that segmentation should not be based only on image signals but has to account also for 3D spatial relationships between signals and region labels in order to preserve the details.

Segmentation techniques consistent with the invention therefore rely on identification of both the spatial interaction between lung voxels and the intensity distribution for the voxels in the lung tissues. Unsupervised segmentation of multi-modal grayscale images may be provided such that each region-of-interest relates to a single dominant mode of the empirical marginal probability distribution of gray levels. Techniques consistent with the invention may be based upon conventional descriptions of the initial images and desired maps of regions by a joint Markov-Gibbs random field (MGRF) model of independent image signals and interdependent region labels, or may utilize a more accurate model identification such as provided in A. Farag, A. El-Baz, and G. Gimel'farb, "Precise Segmentation of Multi-modal Images," IEEE Trans. Image Processing, vol. 15, no. 4, pp. 952-968, April, 2006, which is incorporated by reference herein. In addition, to better specify region borders, each empirical distribution of image signals may be approximated by a linear combination of discrete Gaussians (LCDG) with positive and negative components. The Expectation-Maximization (EM) algorithm may also be modified to deal with the LCDG and also exploit a present EM-based sequential technique to get a close initial LCDG-approximation to start with.

In embodiments consistent with the invention, individual LCDG-models may be in a mixed empirical distribution, including the number of positive and negative Gaussians. Then the initial LCDG-based segmentation may be iteratively refined using the MGRF with analytically estimated potentials.

FIG. 3, for example, illustrates a joint Markov-Gibbs model 60 of LDCT lung images consistent with the invention, including a spatial interaction model 62 and intensity model 64. Let $R=\{(i, j, z): 1 \le i \le I, 1 \le j \le J, 1 \le z \le Z\}$ denote a finite arithmetic grid supporting grayscale LDCT images g: $R \to Q$ and their region maps m: $R \to X$. Here, $Q=\{0, \ldots, Q-1\}$ and $X=\{1, \ldots, X\}$ are the sets of gray levels and region labels, respectively, where Q is the number of gray levels and X is the number of image classes to separate by segmentation. The MGRF model of images to segment is given by a joint probability distribution of LDCT images and desired region maps $P(g,m)=P(m)P(g/m)$. Here, $P(m)$ is an unconditional distribution of maps and $P(g/m)$ is a conditional distribution of images, given a map. The Bayesian MAP estimate of the map, given the image g, $m^*=\text{argmax}_m L(g,m)$ maximizes the log-likelihood function:

$$L(g,m) = \log P(g/m) + \log P(m) \qquad (1)$$

Consistent with the invention, lung segmentation relies on both the accurate identification of the spatial interaction between the lung voxels (P(m)) and the intensity distribution for the lung tissues (P(g/m)) as shown in FIG. 3. An iterative refinement process, using a stochastic optimization algorithm such as a metropolis algorithm, an iterative conditional mode algorithm, a simulated anneal algorithm, and a Gibbs sampler algorithm, or another suitable algorithm, is used to iteratively refine an initial map or segmentation using models representing both the spatial interaction between lung voxels and the intensity distribution for the lung tissues.

First, with respect to the spatial interaction between the lung voxels, a generic Markov-Gibbs model of region maps that accounts for only pairwise interactions between each region label and its neighbors has generally an arbitrary interaction structure and arbitrary Gibbs potentials identified from image data. For simplicity, one can restrict the interactions to the nearest voxels (26-neighborhood) and assume, by symmetry considerations, that the interactions are independent of relative region orientation, are the same for all classes, and depend only on intra- or inter-region position of each voxel pair (i.e. whether the labels are equal or not). Under these restrictions, the spatial interaction model may be similar to the conventional auto-binomial models, and differs primarily in that the potentials are not related to a predefined function and have analytical estimates. The symmetric label interactions are three-fold: the closest horizontal-vertical-diagonal in the current slice (hvdc), the closest horizontal-vertical-diagonal in the upper slice (hvdu), and the closest horizontal-vertical-diagonal in the lower slice (hvdl). The potentials of each type are bi-valued because only coincidence or difference of the labels are taken into account. Let $V_a = \{V_a(x, X) = V_{a,eq}$ if $x = X$ and $V_a(x, X) = V_{a,ne}$ if $x \neq X$: $x, X \in X\}$ denote bi-valued Gibbs potentials describing symmetric pairwise interactions of type $a \in A = \{hvdc, hvdu, hvdl\}$ between the region labels. Let $N_{hvdc} = \{(1, 0, 0), (0, 1, 0), (-1, 0, 0), (0, -1, 0)\}$, $N_{hvdu} = \{(0, 0, 1), (-1, -1, 1), (-1, 1, 1), (1, -1, 1), (1, 1, 1)\}$, and $N_{hvdl} = \{(0, 0, -1), (-1, -1, -1), (-1, 1, -1), (1, -1, -1), (1, 1, -1)\}$ be subsets of inter-voxel offsets for the 26-neighborhood system. Then the Gibbs probability distribution of region maps is as follows:

$$P(m) \propto \exp\left(\sum_{(i,j,z) \in R} \sum_{a \in A} \sum_{(\xi,\eta,\zeta) \in N_a} V_a(m_{i,j,z}, m_{i+\xi,j+\eta,z+\zeta})\right) \quad (2)$$

To identify the MGRF model described in equation (2), the Gibbs Potentials V are estimated using an analytical maximum likelihood estimation as follows:

$$V_{a,eq} = \frac{X^2}{X-1}\left(f'_a(m) - \frac{1}{X}\right) \quad (3)$$

and $$V_{a,en} = \frac{X^2}{X-1}\left(f''_a(m) - 1 + \frac{1}{X}\right)$$

where $f'_a(m)$ and $f''_a(m)$ denote the relative frequency of the equal and non-equal pairs of the labels in all the equivalent voxel pairs $\{((i, j, z), (i+\xi, j+\eta, z+\zeta)): (i, j, z) \in R.; (i+\xi, j+\eta, z+\zeta) \in R; (\xi, \eta, \zeta) \in N_a\}$, respectively.

With respect to the intensity distribution for the lung tissues, an intensity model may be defined as follows: Let $q$; $q \in Q = \{0, 1, \ldots, Q-1\}$, denote the Q-ary gray level. The discrete Gaussian is defined as the probability distribution $\Psi_\theta = (\Psi(q/\theta): q \in Q)$ on Q such that $\Psi(q/\theta) = \Phi_\theta(q+0.5) - \Phi_\theta(q-0.5)$ for $q = 1, \ldots, Q-2$, $\Psi(0/\theta) = \Phi_\theta(0.5)$, $\Psi(Q-1/\theta) = 1 - \Phi_\theta(Q-1.5)$ where $\Phi_\theta(q)$ is the cumulative Gaussian function with a shorthand notation $\theta = (\mu, \sigma^2)$ for its mean, $\mu$, and variance, $\sigma^2$. One can assume the number K of dominant modes, i.e. regions, objects, or classes of interest in a given LDCT image, is already known. In contrast to a conventional mixture of Gaussians and/or other simple distributions, one per region, one can closely approximate the empirical gray level distribution for LDCT images with an LCDG having $C_p$ positive and $C_n$ negative components such that $C_p \leq K$:

$$p_{w,\Theta}(q) = \sum_{r=1}^{C_p} w_{p,r}\psi(q|\theta_{p,r}) - \sum_{l=1}^{C_n} w_{n,l}\psi(q|\theta_{n,l}) \quad (4)$$

under the obvious restrictions on the weights $w = [w_{p,.}, w_{n,.}]$: all the weights are non-negative and $$\sum_{r=1}^{C_p} w_{p,r} - \sum_{l=1}^{C_n} w_{n,l} = 1 \quad (5)$$

To identify the LCDG-model including the numbers of its positive and negative components, one can modify the EM algorithm to address the LCDG.

First, the numbers $C_p$-K, $C_n$ and parameters $w$, $\Theta$ (weights, means, and variances) of the positive and negative discrete Gaussian (DG) components are estimated with a sequential EM-based initializing algorithm. The goal is to produce a close initial LCDG-approximation of the empirical distribution. Then under the fixed $C_p$ and $C_n$, all other model parameters are refined with an EM algorithm that modifies a conventional EM algorithm to account for the components with alternating signs.

Sequential EM-based initialization:

Sequential EM-based initialization forms an LCDG-approximation of a given empirical marginal gray level distribution using the conventional EM-algorithm adapted to the DGs. At the first stage, the empirical distribution is represented with a mixture of K positive DGs, each dominant mode being roughly approximated with a single DG. At the second stage, deviations of the empirical distribution from the dominant K-component mixture are modeled with other, "subordinate" components of the LCDG. The resulting initial LCDG has K dominant weights, say, $w_{p,1}, \ldots, w_{p,K}$ such that $\sum_{r=1}^{K} w_{p,r} = 1$, and a number of subordinate weights of smaller values such that $\sum_{r=K+1}^{C_p} w_{p,r} - \sum_{l=1}^{C_n} w_{n,l} = 0$.

The subordinate components are determined as follows. The positive and negative deviations of the empirical distribution from the dominant mixture are separated and scaled up to form two new "empirical distributions". The EM algorithm is iteratively exploited to find the subordinate mixtures of positive or negative DGs that approximate best the scaled-up positive or negative deviations, respectively. The sizes $C_p$-K and $C_n$ of these mixtures are found by sequential minimization of the total absolute error between each scaled-up deviation and its mixture model by the number of the components. Then the obtained positive and negative subordinate models are scaled down and then added to the dominant mixture yielding the initial LCDG model.

Modified EM algorithm for LCDG:

A modified EM algorithm for LCDG maximizes the log-likelihood of the empirical data by the model parameters assuming statistically independent signals:

$$L(w,\Theta) = \sum_{q \in Q} f(q) \log p_{w,\Theta}(q) \quad (6)$$

A local maximum of the log-likelihood in equation (6) is given with the EM process extending the conventional EM algorithm onto alternating signs of the components. Let $p_{w,}^{[m]} \ominus (q) = \sum_{r=1}^{C_p} w_{p,r}^{[m]} \psi(q|\theta_{p,r}^{[m]}) - \sum_{l=1}^{C_n} w_{n,l}^{[m]} \psi(q|\theta_{n,l}^{[m]})$ denote the current LCDG at iteration m. Relative contributions of each signal $q \in Q$ to each positive and negative DG at iteration m are specified by the respective conditional weights:

$$\pi_p^{[m]}(r|q) = \frac{w_{p,r}^{[m]} \psi(q|\theta_{p,r}^{[m]})}{p_{w,}^{[m]} \ominus (q)}; \pi_n^{[m]}(l|q) = \frac{w_{n,l}^{[m]} \psi(q|\theta_{n,1}^{[m]})}{p_{w,}^{[m]} \ominus (q)} \quad (7)$$

such that the following constraints hold:

$$\sum_{r=1}^{C_p} \pi_p^{[m]}(r|q) - \sum_{l=1}^{C_n} \pi_n^{[m]}(l|q) = 1; q = 0, \ldots, Q-1 \quad (8)$$

The following two steps iterate until the log-likelihood changes become small:

E-step$^{[m+1]}$: Find the weights of equation (7) under the fixed parameters $w^{[m]}$, $\ominus^{[m]}$ from the previous iteration m, and M-step$^{[m+1]}$: Find conditional MLEs $w^{[m+1]}$, $\ominus^{[m+1]}$ by maximizing $L(w,\ominus)$ under the fixed weights of equation (7).

This process converges to a local log-likelihood maximum. Let the log-likelihood of equation (6) be rewritten in the equivalent form with the constraints of equation (8) as unit factors:

$$L(w^m, \ominus^{[m]}) = \sum_{q=0}^{Q} f(q) \left[ \sum_{r=1}^{C_p} \pi_p^{[m]}(r|q) \log p^{[m]}(q) - \sum_{l=1}^{C_n} \pi_n^{[m]}(l|q) \log p^{[m]}(q) \right] \quad (9)$$

Let the terms $\log p^{[m]}(q)$ in the first and second brackets be replaced with the equal terms $\log w_{p,r}^{[m]} + \log \psi(q|\theta_{p,r}^{[m]}) - \log \pi_p^{[m]}(r|q)$ and $\log w_{n,l}^{[m]} + \log \psi(q|\theta_{n,l}^{[m]}) - \log \pi_n^{[m]}(l|q)$, respectively, which follow from equation (7). At the E-step, the conditional Lagrange maximization of the log-likelihood of equation (9) under the Q restrictions of equation (8) results just in the weights $\pi_p^{[m+1]}(r|q)$ and $\pi_n^{[m+1]}(l|q)$ of equation (7) for all r=1, Cp; l=1, ..., Cn and $q \in Q$. At the M-step, the DG weights $w_{p,r}^{[m+1]} = \sum_{q \in Q} f(q) \pi_p^{[m+1]}(r|q)$ and $w_{n,l}^{[m+1]} = \sum_{q \in Q} f(q) \pi_n^{[m+1]}(l|q)$ follow from the conditional Lagrange maximization of the log-likelihood in equation (9) under the restriction of equation (5) and the fixed conditional weights of equation (7). Under these latter, the conventional MLEs of the parameters of each DG stem from maximizing the log-likelihood after each difference of the cumulative Gaussians is replaced with its close approximation with the Gaussian density (below "c" stands for "p" or "n", respectively):

$$\mu_{c,r}^{[m+1]} = \frac{1}{w_{c,r}^{[m+1]}} \sum_{q \in Q} q \cdot f(q) \pi_c^{[m+1]}(r|q) \quad (10)$$

$$(\sigma_{c,r}^{[m+1]})^2 = \frac{1}{w_{c,r}^{[m+1]}} \sum_{q \in Q} (q - \mu_{c,i}^{[m+1]})^2 \cdot f[q] \pi_c^{[m+1]}(r|q) \quad (11)$$

This modified EM-algorithm is valid until the weights w are strictly positive. The iterations should be terminated when the log-likelihood of equation (6) does not change or begins to decrease due to accumulation of rounding errors.

The final mixed LCDG-model $p_c(q)$ is partitioned into the K LCDG submodels $P[k]=[p(q|k): q \in Q]$, one per class k=1, ..., K, by associating the subordinate DGs with the dominant terms so that the misclassification rate is minimal.

Figure 4:
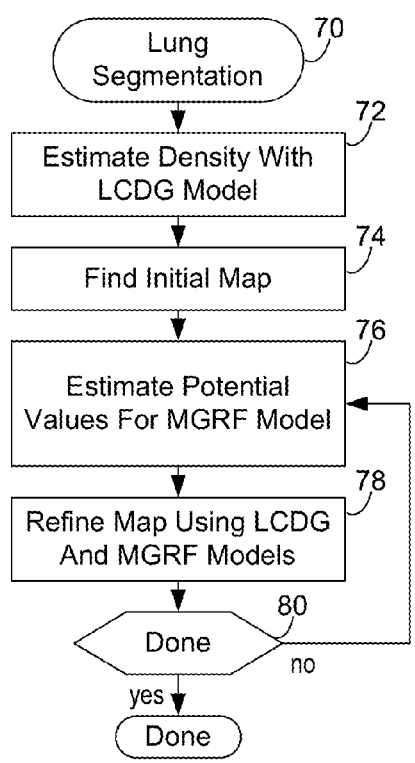
FIG. 4 is a flowchart of a lung segmentation process capable of being implemented in the diagnostic process of FIG. 1.

As shown in FIG. 4, the resulting iterative segmentation process 70 is as follows:

Initialization (blocks 72-74): Find an initial map by the voxelwise Bayesian MAP classification of a given LDCT image after initial estimation of X LCDG-models of signals of each object class represented by one of the dominant modes.

Iterative refinement (blocks 76-80): Refine the initial map by iterating these two steps:

Estimate the potential values for region map model using equation (3) (block 76).

Refine the map by re-collecting the empirical gray level densities for the current regions, re-approximating these densities, and updating the map (block 78).

As shown in block 80, refinement is complete when a terminating condition is reached, e.g., when the log-likelihood of equation (6) does not change or begins to decrease due to accumulation of rounding errors.

Lung Segmentation Working Example

Figure 5A:
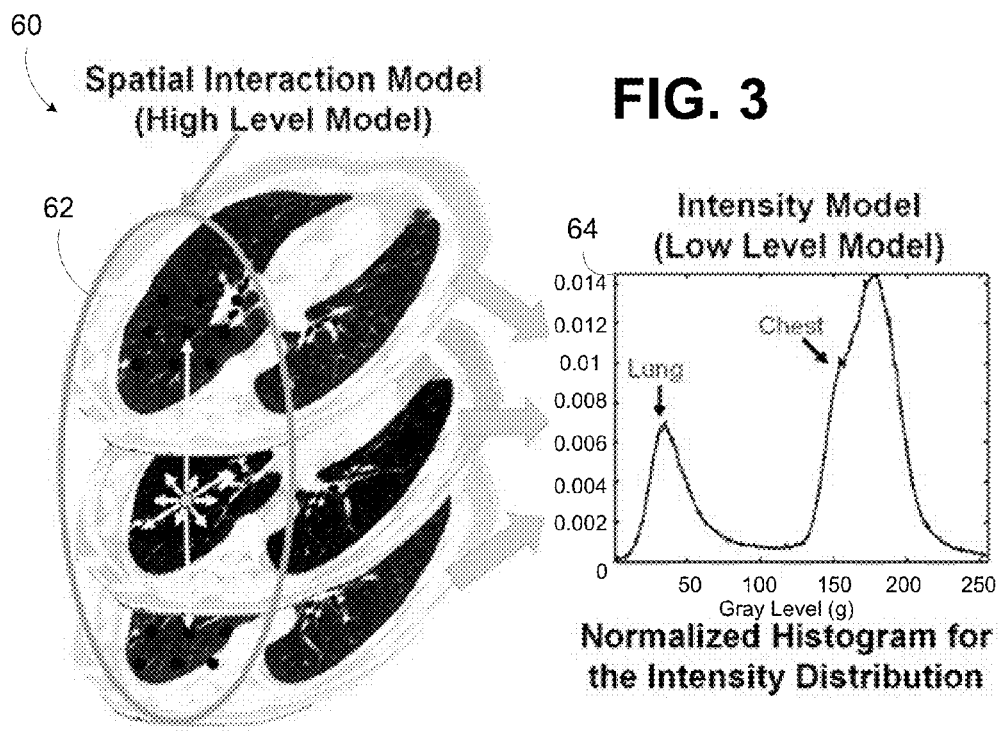
FIG. 5A is an exemplary LDCT scan slice and FIG. 5B is the empirical distribution f(q) and the estimated dominant 2-component mixture $p_2(q)$ therefor.
Figure 5B:
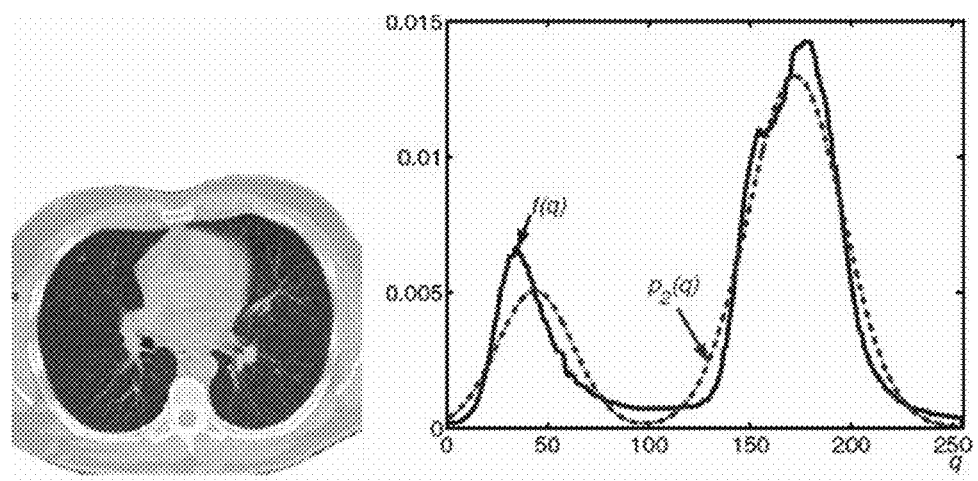
Figure 6A:
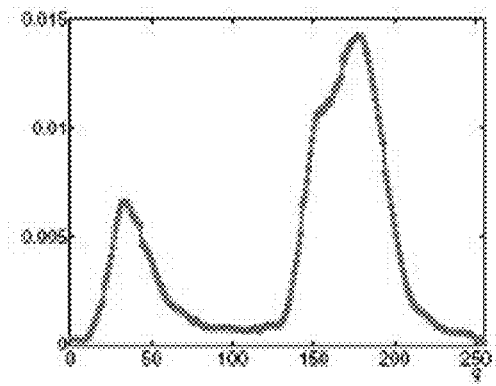
FIG. 6A is a graph of a 2-class LCDG model overlaying empirical density.
Figure 6B:
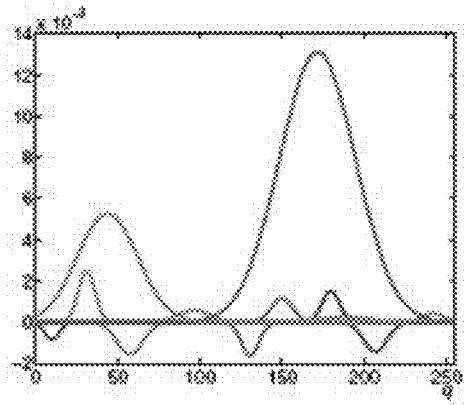
FIG. 6B is a graph of the LCDG model components for the LCDG model of FIG. 6A.
Figure 6C:
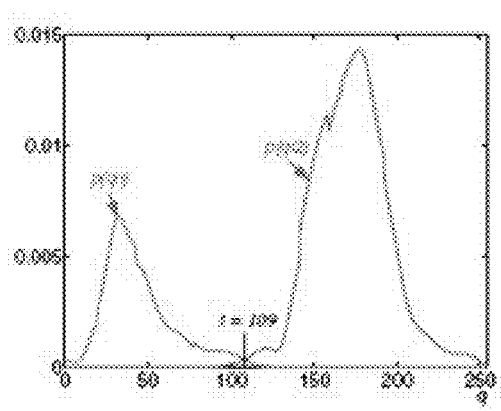
FIG. 6C is a graph of the estimated density for each class using LCDG models.

Experiments were conducted with Low Dose Computed Tomography (LDCT) images acquired with a multidetector GE Light Speed Plus scanner (General Electric, Milwaukee, USA) with the following scanning parameters: slice thickness of 2.5 mm reconstructed every 1.5 mm, scanning pitch 1.5, 140 KV, 100 MA, and F.O.V 36 cm. The size of each 3D data set was 512×512×182. The LDCT images contained two classes (K=2), namely, darker lung tissues and brighter chest region. A typical LDCT slice, its empirical marginal gray level distribution f(q), and the initial 2-component Gaussian dominant mixture $p_2(q)$ are shown in FIGS. 5A and 5B. FIGS. 6A-6C present the final estimated LCDG-model using the modified EM-algorithm disclosed herein. FIG. 6A illustrates a final 2-class LCDG-model overlaying the empirical density, FIG. 6B illustrates the LCDG model components, and FIG. 6C illustrates the estimated density for each class using LCDG-models. As shown in FIG. 6C, the final LCDG of each class is obtained with the best separation threshold t=109. In addition, Table I below compares the accuracy of the disclosed segmentation algorithm to five algorithms, the Iterative Threshold (IT) algorithm (disclosed in S. Hu, E. Hoffman, and J. Reinhardt, "Automatic Lung Segmentation for Accurate Quantitation of Volumetric X-ray CT Images," IEEE Transactions on Medical Imaging, vol. 20, pp. 490-498, June 2001), the MRS algorithm (disclosed in Bouman, C., Liu, B., "Multiple resolution segmentation of textured images," IEEE Trans. Pattern Analysis Machine Intelligence 13, 99-113 (1991)), the ICM algorithm (disclosed in Besag; J., "On the statistical analysis of dirty pictures," J. Royal Statistical Society B48, 259-302 (1986)), the gradient-based deformable model DMG (disclosed in Kass, M., Witkin, A., Terzopoulos, D.: Snakes, "Active contour models," Int. J. Computer Vision 1, 321-331 (1987)), and the deformable model based on the gradient vector flow GVF (disclosed in Xu, C., Prince, J., "Snakes, shapes, and gradient vector flow," IEEE Trans. Pattern Analysis Machine Intelligence 7, 359-369 (1998)).

TABLE I

Comparison of Segmentation Algorithms

| Error, % | Disclosed | Segmentation Algorithm | | | | |
| --- | --- | --- | --- | --- | --- | --- |
| | | IT | MRS | ICM | DMG | GVF |
| Minimum | 0.1 | 2.81 | 1.90 | 2.03 | 10.1 | 4.10 |
| Maximum | 2.15 | 21.9 | 9.80 | 17.1 | 29.1 | 18.2 |
| Mean | 0.32 | 10.9 | 5.10 | 9.80 | 15.1 | 13.2 |
| St. Dev. | 0.71 | 6.04 | 3.31 | 5.11 | 7.77 | 4.81 |
| Significance Less Than | | $10^{-4}$ | $10^{-3}$ | $10^{-4}$ | $10^{-4}$ | $10^{-4}$ |

Figure 7D:
FIGS. 7C and 7D are initial and final segmentations of an exemplary LDCT image using a conventional normal mixture obtained by the EM algorithm.
Figure 7C:
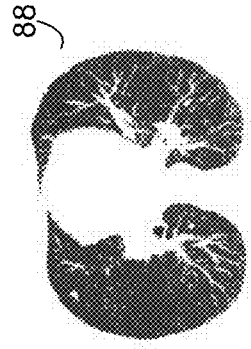
Figure 7B:
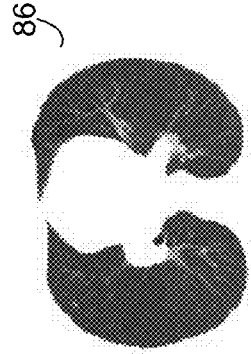
FIGS. 7A and 7B are initial and final segmentations of an exemplary LDCT image using the lung segmentation process of FIG. 4.
Figure 7A:
Figure 7H:
FIG. 7H is a ground truth segmentation of an exemplary LDCT image produced by a radiologist.
Figure 7G:
FIG. 7G is a segmentation of an exemplary LDCT image using a conventional ICM algorithm.
Figure 7F:
FIG. 7F is a segmentation of an exemplary LDCT image using a conventional MRS algorithm.
Figure 7E:
FIG. 7E is a segmentation of an exemplary LDCT image using randomly chosen Gibbs potentials of the map model to refine the initial segmentation of FIG. 7A.

The region map obtained first with only the class LCDG-models was further refined using the iterative segmentation algorithm. Changes in the likelihood L(g,m) became very small after 12 iterations. For this map the initial estimated parameters were $V_{a,eq} = -V_{a,ne} = 1.02$, and the final estimated parameters were $V_{a,eq} = V_{a,ne} = 1.67$. The final region map produced with these parameters using the Metropolis voxelwise relaxation is shown in FIG. 7B at 86 (a final error of 1.1% compared to the ground truth). For comparison, FIGS. 7A and 7C-7H present also the initial region map 84, initial (88) and final (90) segmentation using the conventional normal mixture obtained by the EM algorithm (a final error of 5.1%); refined lung regions (92) obtained from (84) using the randomly chosen Gibbs potentials of the map model (a final error of 1.8%); best segmentation (94) obtained by the MRS algorithm with the potential values 0.3 and three level of resolution (a final error of 2.3%); best segmentation (96) obtained by the ICM algorithm with the potential values 0.3 (a final error of 2.9%), and the ground truth (98) produced by a radiologist.

As such, the segmentation algorithm disclosed herein offers significant improvements over conventional segmentation algorithms. As indicated in Table I, the most accurate algorithm among these latter algorithms, namely, the MRS algorithm, had a larger error range of 1.9-9.8% and a mean error of 5.1% with respect to the ground truth. In contrast, the disclosed segmentation algorithm had a smaller error range of 0.1-2.15% and a mean error of 0.32%, which is more than fifteen times less than the MRS algorithm. In addition, with the aforementioned algorithm implemented in the C++ programming language on an Intel® quad processor (3.2 GHz each) with 16 GB memory and a 2 TB hard drive with RAID technology, it took about 296 sec for processing 182 LDCT slices of size 512×512 pixels each, i.e., about 1.65 sec per slice.

Lung Registration

As noted above, registration techniques consistent with the invention align serial LDCT image scans to assist in the calculation of volumetric changes in detected nodules and thereby accurately calculate the rate of growth of pulmonary nodules, which has been found to be a significant factor in the characterization of a nodule as being malignant. Tracking temporal nodule behavior has been found to be a challenging task because of changes in the patient's position at each data acquisition and effects of heart beats and respiration. In order to accurately measure how the nodules are developing in time, all these motions should be compensated by registering LDCT data sets taken at different times. Registration of two successive CT chest scans determines transformation of one image with respect to the other.

Consistent with the invention, the whole motion of the lung due to patient movements and breathing is considered to be a combination of a dominant global affine motion and relatively small local continuous motions. Registration techniques consistent with the invention combine an initial global affine alignment of one scan (a target) to another scan (a prototype) using a learned prior appearance model and a subsequent local alignment that accounts for more intricate continuous deformations.

Specifically, first and second medical image data, e.g., first and second data sets of LDCT images taken at two different points in time, may be registered by transforming the first and second medical image data to a Gibbs energy domain, performing a global alignment of the first and second medical image data using an affine translation that maximizes Gibbs energy, and after performing the global alignment, performing a local alignment of the first and second medical image data by matching iso-surfaces generated for the first and second medical image data based on Gibbs energy. As such, registration is performed in the Gibbs energy domain, and Gibbs energy (e.g., as represented in a MGRF) is used as a similarity measure in registering two data sets together.

Figure 8:
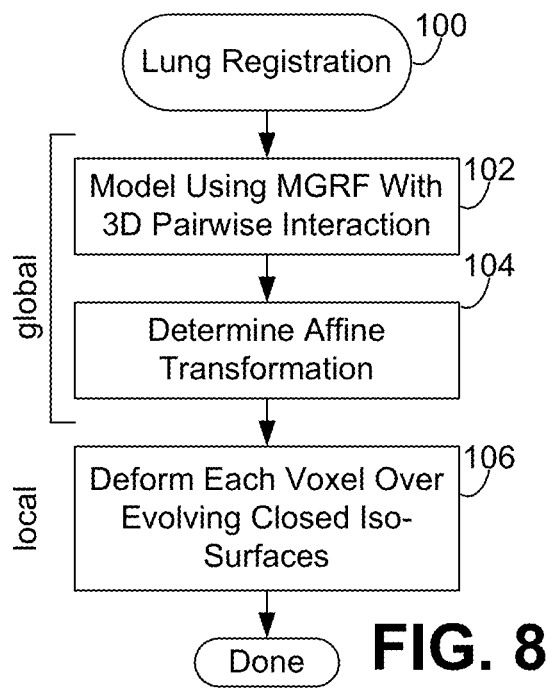
FIG. 8 is a flowchart of a lung registration process capable of being implemented in the diagnostic process of FIG. 1.

As illustrated in FIG. 8, in a lung registration process 100 consistent with the invention, to evaluate the global motion, the visual appearance of a lung in two subsequent LDCT images is modeled by a Markov-Gibbs random field (MGRF) with pairwise interaction extended to 3D images (block 102). Then an affine transformation to register the target image to the reference is found by the gradient ascent-based maximization of a special Gibbs energy function (block 104). To model accurately visual appearance of the LDCT images of lungs, a selection technique, described in greater detail below, was developed for automatically selecting the most characteristic pairwise interactions.

Local deformations are handled based on deforming each voxel over evolving closed iso-surfaces (equispaced surfaces) in such a way as to closely match a prototype (i.e., a reference lung object) (block 106). A speed function guides the evolution of the iso-surfaces to minimize distances between the corresponding voxel pairs on the iso-surfaces on both the images.

In particular, each of two successive CT images is globally registered to determine an absolute orientation of one data set with respect to another for a given patient, initially by automatically finding corresponding points for the two data sets. In the context of feature invariance, specific interest points should be selected to achieve the repeatability under different imaging conditions. Typically, the greatest challenge is the invariance with respect to scale changes. The scale-space theory offers basic tools for selecting the most robust feature locations, or interest points, against scale variations. Techniques disclosed herein build a descriptor in a 3D space using gradient orientation histograms with 2D polar-coordinate bins for neighboring cells consisting of the voxels in the current level neighborhood of every interest point. The final descriptor is built and is normalized to reduce the effect of linear intensity changes. Then, given a descriptor feature in the first image/dataset, its match to the second image/dataset is found if the distance between two descriptors is above a certain threshold.

As shown in FIGS. 9A-9C, to model a global motion between two CT data sets, the global registration technique disclosed herein is used to find corresponding pairs between two data sets, e.g., a reference data set such as illustrated in FIG. 9A and a target data set as shown in FIG. 9B. Matching pairs are then used to estimate a 3D global transformation by the gradient descent minimization of the mean squared positional error between the corresponding points, e.g., using a global 9 DOF affine transformation model. The result of this rigid registration is shown in FIG. 9C, which illustrates the transformation of the target data set of FIG. 9B. FIG. 9D, however, shows a checkerboard visualization of the globally aligned target data of FIG. 9C overlayed with the reference data set of FIG. 9A, demonstrating the negative effect of the motion of the lung tissues. It can be seen that the transitions between the two co-registered volumes at the edges of the lung are not smooth when only the global model is used due to local deformation from breathing and the heart beating.

Local deformations of an imaged organ are handled by evolving closed equispaced surfaces (or iso-surfaces) to closely match the prototype. The speed of the iso-surface evolution is guided by an exponential function in the directions that minimize distances between the corresponding pixel pairs on the iso-surfaces on both the images. A 3D local invariant feature descriptor (discussed in greater detail below) is built for each point of each iso-surface after discretization. These descriptors, which are invariant to the image deformations, may be used for image similarity measure.

Figure 10:
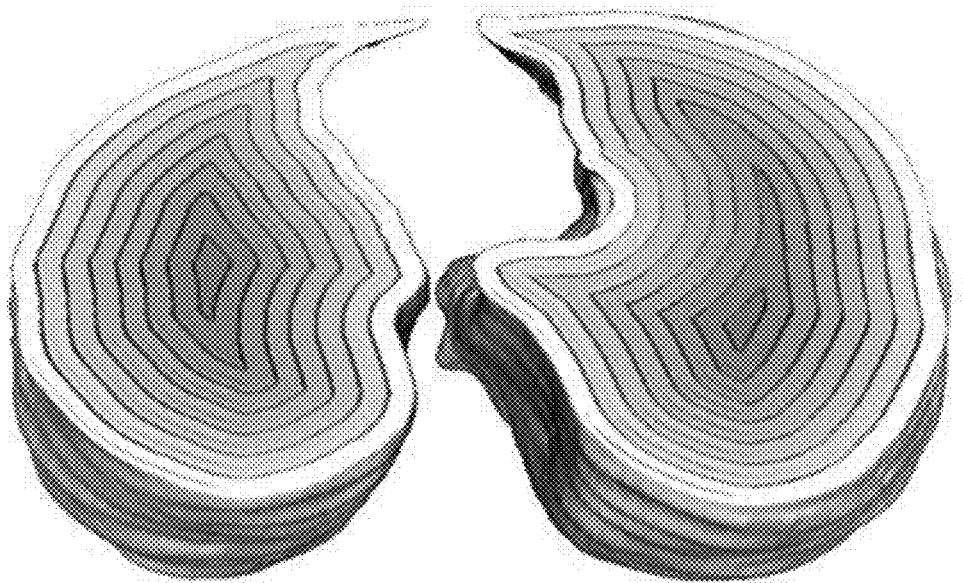
FIG. 10 is an axial cross sectional view of generated iso-surfaces after global alignment using the process of FIG. 8.

A distance map is then generated in the lung images using fast marching level sets. This distance map is used to generate iso-surfaces as shown in FIG. 10. Note that the number of iso-surfaces, which is not necessarily the same for both images, depends on the accuracy and the speed required by the user. Correspondences between the iso-surfaces using the descriptor feature may then be determined. The iso-surfaces are then evolved to deform the iso-surfaces in the first data set (the target image) to match the iso-surfaces in the second data set (the source image). FIGS. 9D and 9E, for example, illustrate the registration results after applying the local deformation model. The transitions at the edges of the lung region and between the two volumes are much smoother when using the present local deformation model.

Global Alignment

Let $Q=\{0, Q-1\}$ (a finite set of scalar image signals (e.g. gray levels)), $R=[(x, y, z): x=0, \ldots, X=1; y=0, \ldots, Y=1; z=0, \ldots, Z-1]$ (a 3D arithmetic lattice supporting digital LDCT image data g: $R \rightarrow Q$), $R_p \subset R$ (an arbitrary-shaped part of the lattice occupied by a prototype), $N=\{(\xi_1, \eta_1, \zeta_1), \ldots, (\xi_n, \eta_n, \zeta_n)\}$ (a finite set of (x, y, z)-coordinate offsets defining neighboring voxels, or neighbors $\{((x+\xi, y+\eta, z+\zeta), (x-\xi, y-\eta, z-\zeta)):(\xi, \eta, \zeta) \in N\} \wedge R_p$ interacting with each voxel (x, y, z) $\in R_p$ and T be an indicator of vector or matrix transposition. The set N yields a 3D neighborhood graph on $R_p$ describing translation invariant pairwise interactions between the voxels with $|N|$ families $\phi_{\xi,\eta,\zeta}$ of the second-order cliques $c_{\xi,\eta,\zeta}(x, y, z)=((x, y, z), (x+\xi, y+\eta, z+\zeta))$. Quantitative interaction strengths for the clique families are given by a vector $V^T=[V^T_{\xi,\eta,\zeta}: (\xi, \eta, \zeta) \in N]$ of potentials $V^T_{\xi,\eta,\zeta}=[V_{\xi,\eta,\zeta}(q, q'): (q, q') \in Q^2]$ being functions of signal co-occurrences in the cliques.

To account for possible monotone (order-preserving) changes of signals, e.g. due to different sensor characteristics, every LDCT data set may be equalized using the cumulative empirical probability distribution of its signals.

An MGRF-based appearance model is learned by finding the neighborhood system (i.e. the subsets of voxels which have strong relations with each current voxel) and estimating the interaction between each two voxels in this neighborhood system.

In a generic MGRF with multiple pairwise interaction, the Gibbs probability $P(g) \propto \exp(E(g))$ of an object g aligned with the prototype $g^0$ on $R_p$ is specified with the Gibbs energy $E(g)=|R_p|V^T F(g)$. Here, $F^T(g)$ is the vector of scaled empirical probability distributions of signal co-occurrences over each clique family: $F^T(g)=[p_{\xi,\eta,\zeta} F^T_{\xi,\eta,\zeta}(g): (\xi, \eta, \zeta) \in N]$; $p_{\xi,\eta,\zeta}=|\phi_{\xi,\eta,\zeta}|/|R_p|$ the relative size of the family $\phi_{\xi,\eta,\zeta}$ and $F_{\xi,\eta,\zeta}(g)$ is the vector of empirical probabilities for this family: $F_{\xi,\eta,\zeta}(g)=[f_{\xi,\eta,\zeta}(q, q'|g): (q, q') \in Q^2]^T$ where $f_{\xi,\eta,\zeta}(q, q'|g)=|\phi_{\xi,\eta,\zeta;q,q'}(g)|/|\phi_{\xi,\eta,\zeta}|$ are empirical signal co-occurrence probabilities and $\phi_{\xi,\eta,\zeta;q,q'}(g) \subseteq \phi_{\xi,\eta,\zeta}$ is a subfamily of the cliques $c_{\xi,\eta,\zeta}(x, y, z)$ supporting the co-occurrence $(g_{x,y,z}=q, g_{x+\xi,y+\eta,z+\zeta}=q')$ in g.

The co-occurrence distributions and the Gibbs energy for the object are determined over $R_p$, i.e., within the prototype boundary after an object is affinely aligned with the prototype. To account for the affine transformation, the initial image is resampled to the back-projected $R_p$ by interpolation.

The appearance model may consist of the neighborhood N and the potential V to be learned from the prototype. N and V for the lung tissues from the LDCT images may be estimated as follows.

Learning the Potentials:

In the first approximation, the maximum likelihood estimate (MLE) of V is proportional to the scaled and centered empirical co-occurrence distributions for the prototype:

$$V_{\xi,\eta,\zeta} = \lambda \rho_{\xi,\eta,\zeta} \left( F_{\xi,\eta,\zeta}(g^0) - \frac{1}{Q^2} U \right), (\xi, \eta, \zeta) \in N \quad (12)$$

where U is the vector with unit components. The common scaling factor $\lambda$ is also computed analytically; it is approximately equal to $Q^2$ if $Q \gg 1$ and $\sigma_{\xi,\eta,\zeta} \approx 1$ for all $(\xi, \eta, \zeta) \in N$. In this case it can be set to $\lambda=1$ because the registration uses only relative potential values and energies.

Figure 11A:
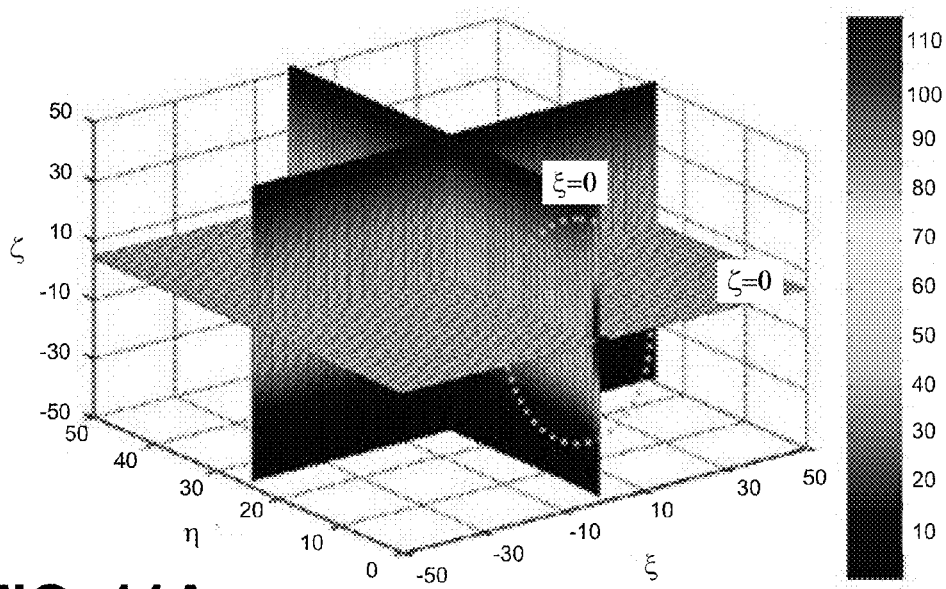
FIG. 11A is a graph of two cross-sections of a lung tissue data set in the 3D relative interaction Gibbs energies and FIG. 11B is a graph of the 2D cross-section of the relative interaction Gibbs energies at the plane $\xi=0$.
Figure 11B:
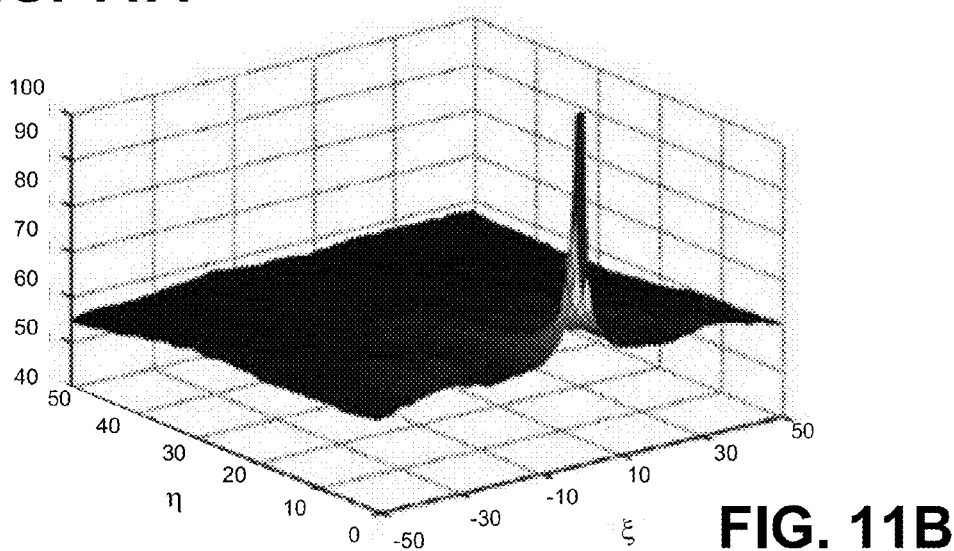

Learning the Characteristic Neighbors:

To find the characteristic neighborhood set N, the relative energies $E_{\xi,\eta,\zeta}(g^0) = \rho_{\xi,\eta,\zeta} V^T_{\xi,\eta,\zeta} F_{\xi,\eta,\zeta}(g^0)$, i.e., the scaled variances of the corresponding empirical co-occurrence distributions for the clique families, are compared for a large number of possible candidates. For illustration, FIG. 11A shows 2D axial and saggital cross-sections of the estimated relative 3D Gibbs energies $E_{\xi,\eta,\zeta}(g^0)$, and FIG. 11B shows the 2D axial cross-section of these energies for 5100 clique families with the inter-voxel offsets $|\xi| \leq 50$; $0 \leq \eta \leq 50$ and $\zeta=0$.

To automatically select the characteristic neighbors, one can consider an empirical probability distribution of the energies as a mixture of a large "non-characteristic" low-energy component and a considerably smaller characteristic high-energy component: $P(E)=\pi P_{lo}(E)+(1-\pi)P_{hi}(E)$. The components $P_{lo}(E)$ and $P_{hi}(E)$ are of arbitrary shape and thus are approximated with linear combinations of positive and negative discrete Gaussians (LCDG) using efficient expectation—maximization-based algorithms introduced in the aforementioned A. Farag, A. El-Baz, and G. Gimel'farb, "Precise Segmentation of Multi-modal Images," IEEE Trans. Image Processing, vol. 15, no. 4, pp. 952-968, April, 2006. FIGS. 12A-12F show the approximation steps for these algorithms. In particular, FIG. 12A shows the empirical energy distribution $f_{emp}(E)$ and the estimated mixture of two dominant Gaussians $P_2(E)$ representing the low- and high-energy distributions, FIG. 12B shows the sign-alternate and absolute deviations between $f_{emp}(E)$ and $P_2(E)$ (b), FIG. 12C shows the mixture model estimated absolute deviations (c), FIG. 12D shows the resulting positive and negative components of the LCDG, FIG. 12E shows the final LCDG that approximates the empirical distribution, and FIG. 12F shows the two estimated weighed energy distributions $\pi P_{lo}(E)$ and $(1-\pi)P_{hi}(E)$.

The intersection of the estimated mixture components gives an energy threshold $\ominus$ for selecting the characteristic neighbors: $N=\{(\xi,\eta):E_{\xi,\eta}(g^0)\geq\ominus\}$ where $P_{hi}(\ominus)\geq P_{lo}(\ominus)\pi/(1-\pi)$. The above example results in the threshold $\ominus=28$ producing 275 characteristic neighbors shown in FIGS. 13A-13C, where FIG. 13A illustrates a 3D system estimated for the lung tissues, FIG. 13B illustrates a 2D cross-section of the 3D system of FIG. 13A in the plane $\xi=0$ (in white), and FIG. 13C illustrates the superposition of the 3D neighborhood system onto a 3D model of the lungs reconstructed from LDCT images.

FIGS. 14A-14C present the relative 3D voxelwise Gibbs energies $e_{x,y,z}(g^0)$ for this system:

$$e_{x,y,z}(g^0) = \sum_{(\xi,\eta,\zeta)\in N} V_{\xi,\eta,\zeta}(g^0_{x,y,z}, g^0_{z+\xi,y+\eta,z+\zeta}) \quad (13)$$

FIG. 14B, in particular, illustrates 3D voxelwise Gibbs energies projected onto 2D axial (A), coronal (C) and saggital (S) planes of LDCT images illustrated in FIG. 14A using a neighborhood system with 275 characteristic neighbors, while FIG. 14C illustrates corresponding 3D voxelwise Gibbs energies using a neighborhood system with 3927 characteristic neighbors. The advantages of using the LCDG model to estimate the neighborhood system are highlighted by approximating the same empirical distribution with a conventional mixture of two positive Gaussians. In this case the resulting neighborhood system is too large (3927 voxels) to capture only the features of the lung tissues and thus relates also to some parts of the background. As a result, the voxelswise Gibbs energies for $|N|=3927$ in FIG. 14C are not smooth, which may significantly affect the quality of global registration.

The desired affine transformation of an object g then corresponds to a local maximum of its relative energy $E(g_a)=V^TF(g_a)$ under the learned appearance model $[N,V]$. Here, $g_a$ is the part of the object image reduced to $R_p$ by a 3D affine transformation $a=[a_{11}, \ldots, a_{34}]$: $x'=a_{11}x+a_{12}y+a_{13}z+a_{14}$; $y'=a_{21}x+a_{22}y+a_{23}z+a_{24}$; $z'=a_{31}x+a_{32}y+a_{33}z+a_{34}$. Its initial step is a pure translation ($a_{11}=a_{22}=a_{33}=1$; $a_{12}=a_{13}=a_{21}=a_{23}=a_{31}=a_{32}=0$) ensuring the most "energetic" overlap between the object and prototype. In other words, the chosen initial position ($a^*_{14}, a^*_{24}, a^*_{34}$) maximizes the energy. Then the gradient ascent-based search for the local energy maximum closest to the initialization selects all the 12 parameters a.

Figure 15A:
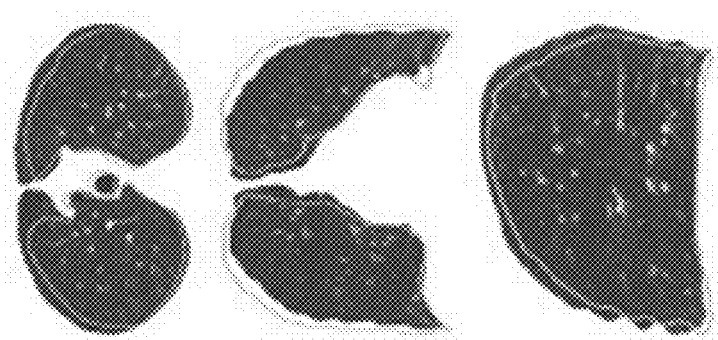
FIG. 15A illustrates global registration results projected onto 2D axial (A), coronal (C) and saggital (S) planes for the process of FIG. 8.
Figure 15B:
FIG. 15B illustrates global registration results projected onto 2D axial (A), coronal (C) and saggital (S) planes for a conventional MI-based registration process.
Figure 15C:
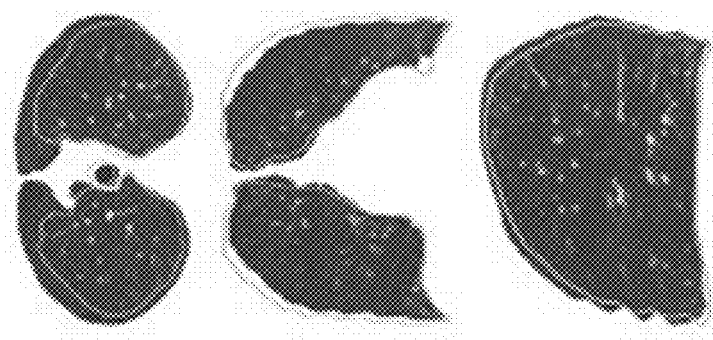
FIG. 15C illustrates global registration results projected onto 2D axial (A), coronal (C) and saggital (S) planes for a conventional NMI-based registration process.
Figure 15D:
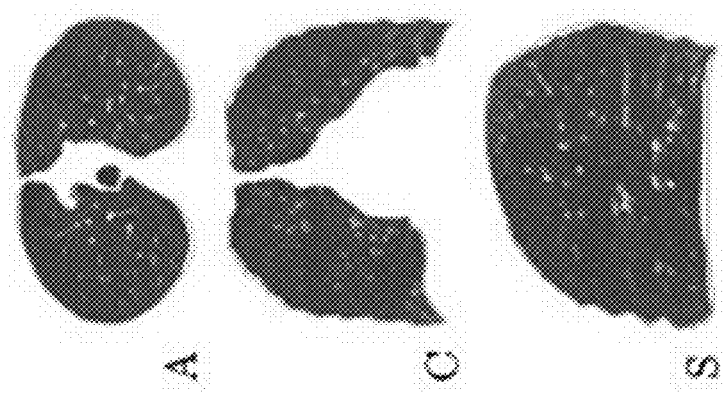
FIG. 15D illustrates global registration results projected onto 2D axial (A), coronal (C) and saggital (S) planes for a conventional SIFT-based registration process.

A comparison was made between the global alignment algorithm described herein and three popular conventional techniques, namely, to the area-based registration by mutual information (MI) (disclosed in P. Viola, "Alignment by maximization of mutual information," Ph.D. Dissertation, MIT, Cambridge, Mass., 1995) or normalized MI (NMI) (disclosed in C. Studholme, D. Hill, D. Hawkes, "An overlap invariant entropy measure of 3D medical image alignment," Pattern Recognition 32 (1999) 71-86) and to the feature-based registration that establishes correspondences between the images with 3D scale-invariant feature transform (SIFT) (disclosed in A. Aly, "Local features invariance beyond 2D gray spaces," Ph. D. Dissertation, University of Louisville, Louisville, Ky., USA, May 2007). Results of the global alignment of two segmented lungs are shown in the axial (A), coronal (C) and saggital (S) planes in FIGS. 15A (for the disclosed technique), 15B (for the MI-based technique), 15C (for the NMI-based technique) and 15D (for the SIFT-based technique).

Local Alignment

To handle local deformations, a target object is deformed over evolving closed equispaced surfaces (or distance iso-surfaces) so that it closely matches the prototype. The evolution is guided by a speed function and intends to minimize distances between corresponding voxel pairs on the iso-surfaces in both the images. A conventional normalized cross-correlation (NCC) of the voxelwise Gibbs energies is used to find correspondences between the iso-surfaces.

Figure 16A:
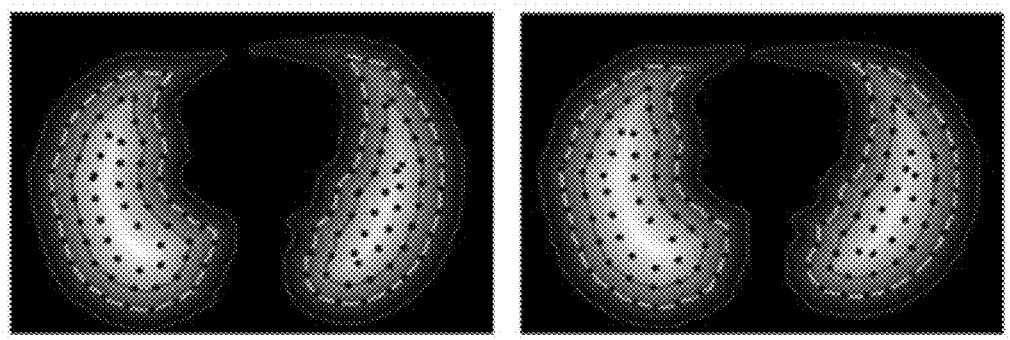
FIG. 16A illustrates a 2D axial cross section of reference and target iso-surfaces.
Figure 16B:
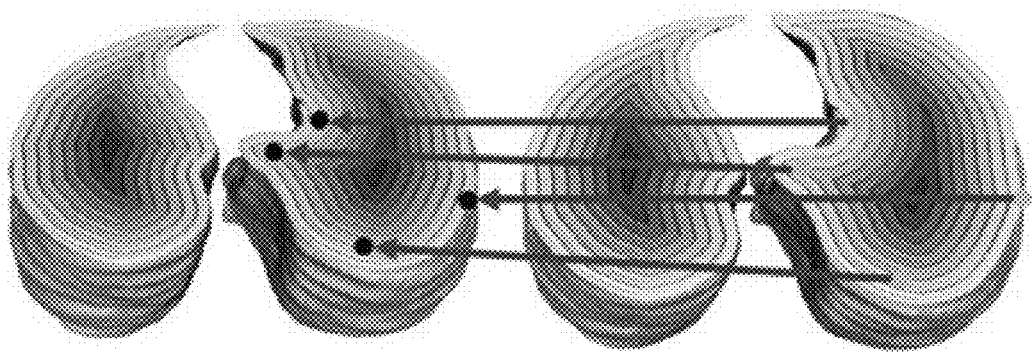
FIG. 16B is a 3D illustration of aligning reference and target iso-surfaces.

The disclosed approach involves the following steps. First, a distance map inside the object is generated using fast marching level sets, e.g. as disclosed in J. Sethian, "Fast marching level set method for monotonically advancing fronts," Proc. Natl. Acad Sci. USA 93 (1996) 1591-1595. Second, the distance map is used to generate iso-surfaces, e.g., as shown in FIGS. 16A (a 2D view) and 16B (a 3D cross-sectional view). Note that the number of iso-surfaces need not necessarily be the same for both the images and will depend on the accuracy and the speed required by the user. The third step includes finding correspondences between the iso-surfaces using the NCC:

$$NCC = \frac{\sum_{x=1}^{m}\sum_{y=1}^{m}\sum_{z=1}^{m}(e(g^0_{xyz})-\varepsilon_{g^0})(e(g_{xyz})-\varepsilon_g)}{\sqrt{\sum_{x=1}^{m}\sum_{y=1}^{m}\sum_{z=1}^{m}(e(g^0_{xyz})-\varepsilon_{g^0})^2}\sqrt{\sum_{x=1}^{m}\sum_{y=1}^{m}\sum_{z=1}^{m}(e(g_{xyz})-\varepsilon_g)^2}} \quad (14)$$

where $\varepsilon_{g^0}=(1/m^3)\sum_{x=1}^{m}\sum_{y=1}^{m}\sum_{z=1}^{m}e(g_{xyz}^0)$ and $\varepsilon_g=(1/m^3)\sum_{x=1}^{m}\sum_{y=1}^{m}\sum_{z=1}^{m}e(g_{xyz})$. Here, $e(g_{xyz})$ is the Gibbs energy at site (x, y, z); $g^0$ is the prototype (reference) image; g is the target image, and m is the size of the 3D cubic window. Note that all the experiments are done for m=3.

Next, the evolution process deforms the iso-surfaces in the first data set (the target image) to match the iso-surfaces in the second data set (the prototype). The following notation is used below for defining the evolution equation:

- $b^h_{g1}=[p^h_k: k=1, \ldots, K]$—K control points on a surface h on the reference data such that $p_k=(x_k, y_k, z_k)$ form a circularly connected chain of line segments $(p_1, p_2), \ldots, (p_{K-1}, p_K), (p_K, p_1)$;
- $b^{\gamma}_{g2}=[p^{\gamma}_n: n=1, \ldots, N]$—N control points on a surface on the target data such that $pn=(x_n, y_n, z_n)$ form a circularly connected chain of line segments $(p_1, p_2), \ldots, (p_{N-1}, p_N), (p_N, p_1)$;
- $S(p^h_k, p^{\gamma}_n)$—the Euclidean distance between a point on the surface h in the image $g_1$ and the corresponding point on the surface $\gamma$ in the image $g_2$;
- $S(p^{\gamma}_n, p_n^{\gamma-1})$—the Euclidean distance between a point on the surface in the image g1 and the nearest point on the surface $-1$ in $g_1$; and
- v(.)—the propagation speed function.

Figure 17:
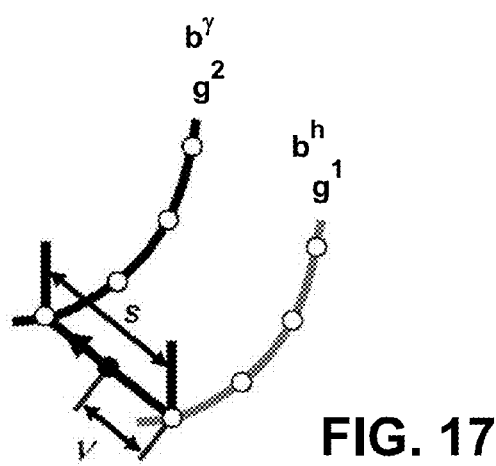
FIG. 17 illustrates an evolution scenario used in the registration process of FIG. 8.

The evolution $b_\tau \to b_\tau+1$ of a deformable boundary b in discrete time, $\tau=0, 1, \ldots$, is specified by the system $p^{\gamma}_{n,\tau+1}=p^{\gamma}_{n,\tau}+v(p^{\gamma}_{n,\tau})u_{n,\tau}$; n=1, \ldots, N of difference where $v(p^{\gamma}_{n,\tau})$ is a propagation speed function for the control point $p^{\gamma}_{n,\tau}$ and $pn_{n,\tau}$ is the unit vector along the ray between the two corresponding points. The propagation speed function:

$$v(p_{n,\tau}^{\gamma})=\min\{S(p_k^h,p_{n,\tau}^{\gamma}),S(p_{n,\tau}^{\gamma},p_{n,\tau}^{\gamma-1}),S(p_{n,\tau}^{\gamma},p_{n,\tau}^{\gamma+1})\} \quad (15)$$

satisfies the condition $v(p^{\gamma}_{n,\tau})=0$ if $S(p^h_k, p^{\gamma}_{n,\tau})=0$ and prevents the current point from cross-passing the closest neighbor surfaces as shown in FIG. 17. The latter restriction is known as the smoothness constraint.

The checkerboard visualization FIG. 9D of the data set in FIG. 9A and the aligned data set in FIG. 9C highlights the effect of the motion of lung tissues. It can be seen that the connections at the lung edges between the two volumes are not smooth when using only the global registration model. This is due to the local deformation which comes from breathing and heart beats. The connections of the lung edges between the two volumes become considerably smoother after using the proposed local deformation (FIGS. 9E and 9F).

Lung Registration Working Example

Figures 18, 19:
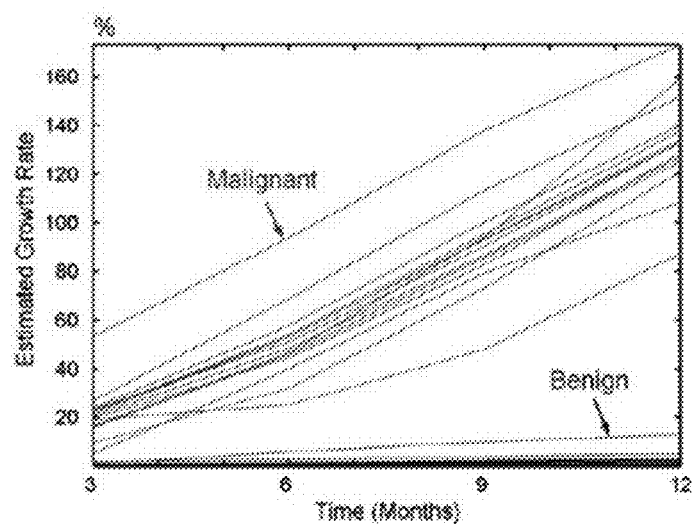
FIG. 18 is a chart illustrating the results of registration for two patients over one year.
FIG. 19 is a graph of estimated volumetric changes for 14 malignant and 13 benign nodules.

The disclosed registration techniques were tested on clinical data sets collected from 27 patients. Each patient had five LDCT scans, with a 3-month period between each two successive scans. This preliminary clinical database was collected by the LDCT scan protocol using a multidetector GE Light Speed Plus scanner (General Electric, Milwaukee, USA) with the following scanning parameters: slice thickness of 2.5 mm reconstructed every 1.5 mm; scanning pitch 1.5 mm; 140 KV; 100MA; and a field-of-view of 36 cm. After the two volumes at different time instants were registered, the lung nodules were segmented after registration using A. Farag, A. El-Baz, G. Gimel'farb, R. Falk, M. Abou El-Ghar, T. Eldiasty, S. Elshazly, "Appearance models for robust segmentation of pulmonary nodules in 3D LDCT chest images," Proceedings of the International Conference on Medical Image Computing and Computer-Assisted Intervention (MICCAI'06), vol. 1, Copenhagen, Denmark, Oct. 1-6, 2006, pp. 662-670 and A. El-Baz, A. Farag, G. Gimel'farb, R. Falk, M. Abou El-Ghar, T. Eldiasty, "A framework for automatic segmentation of lung nodules from low dose chest CT scans," Proceedings of the IAPR International Conference on Pattern Recognition (ICPR'06), Hong Kong, vol. 3, Aug. 20-24, 2006, pp. 611-614, both of which are incorporated by reference herein. Once the nodules were segmented in the original and the registered image sequences, the volumes of the nodules were calculated using the voxel resolution value from the scanner (in this case, 0.7, 0.7, and 2.5 mm, respectively). FIG. 18 shows the estimated growth rate for two detected pulmonary nodules (for two different patients over one year) before and after data alignment.

As can be seen from this figure, the disclosed registration algorithm facilitates accurate evaluations of temporal changes in the nodule size. Moreover, the disclosed algorithm may be used to help doctors and radiologists to track the nodule growth direction, which can be crucial for surgical or radiation treatment. Also, it can be seen that the malignant nodule doubles in size for 360 or less days, while the volumetric changes in the benign nodule are very small (maximum 6% over one year, see FIG. 19), thereby reinforcing the utility of using growth rate as an indicator for lung cancer.

Statistical analysis using the unpaired t-test shows that the differences in the average growth rate between the malignant and benign nodules found with the disclosed registration algorithm are statistically significant at the 95% and higher levels (the p-values in Table II are considerably below 0.05). At the same time Table II shows that no significant difference is found if the growth rate is measured without the data alignment step (all the p-values are above 0.05). FIG. 19 shows volumetric changes for 14 malignant and 13 benign nodules. It is apparent that the growth rate of the malignant nodules is considerably higher than the growth rate of the benign nodules, and this encourages to use the estimated growth rate as a discriminatory feature.

TABLE II

Growth Rate Statistics for 14 Patients with Malignant Nodules and 13 Patients with Benign Nodules ($\mu$ is the mean rate, %; $\sigma$ the standard deviation, %; p the p-value, i.e. the probability that the observed differences between the two types of nodules are purely due to chance)

| Scanning Period | With disclosed registration | | | | | without disclosed registration | | | | |
|---|---|---|---|---|---|---|---|---|---|---|
| | Malignant | | Benign | | | Malignant | | Benign | | |
| | $\mu_M$ | $\sigma_M$ | $\mu_B$ | $\sigma_B$ | p | $\mu_M$ | $\sigma_M$ | $\mu_B$ | $\sigma_B$ | p |
| 3 months | 22 | 16 | 0.9 | 0.7 | $\leq 10^{-4}$ | 5.6 | 4.8 | 2.8 | 1.9 | 0.12 |
| 6 months | 49 | 20 | 2.9 | 2.3 | $\leq 10^{-4}$ | 11 | 6.6 | 8.4 | 5.1 | 0.31 |
| 9 months | 91 | 29 | 4.5 | 3.8 | $\leq 10^{-4}$ | 24 | 9.3 | 17 | 11 | 0.08 |
| 12 months | 140 | 32 | 5.4 | 4.3 | $\leq 10^{-4}$ | 30 | 11 | 20 | 16 | 0.07 |

A traditional Bayesian classifier based on the analysis of the growth rate of both benign and malignant nodules for 27 patients diagnosed 14 and 13 patients as malignant and benign, respectively. For simplicity, this classifier used a multivariate Gaussian model of the growth rate with the rates at 3, 6, 9, and 12 months as four discriminant features. The same patients were diagnosed by biopsy (the ground truth) showing that the classification was 100% correct. Therefore, the disclosed image analysis techniques may be a promising supplement to the current technologies for diagnosing lung cancer.

In addition, with the aforementioned algorithm implemented in the C++ programming language on an Intel® quad processor (3.2 GHz each) with 16 GB memory and a 1.5 TB hard drive with the RAID technology took about 330 s for processing 182 LDCT slices of the size of 512×512 pixels each, i.e. about 1.8 s per slice.

Nodule Segmentation

After the data alignment, the lung nodules are accurately segmented from the CT data. To separate each pulmonary nodule from its background in a CT chest image, various techniques may be used, e.g., an adaptive probabilistic model of visual appearance of small 2D and large 3D pulmonary nodules to control the evolution of a deformable boundary as disclosed in A. Farag, A. El-Baz, G. Gimel'farb, R. Falk, M. Abou El-Ghar, T. Eldiasty, S. Elshazly, "Appearance models for robust segmentation of pulmonary nodules in 3D LDCT chest images," Proceedings of the International Conference on Medical Image Computing and Computer-Assisted Intervention (MICCAI'06), vol. 1, Copenhagen, Denmark, Oct. 1-6, 2006, pp. 662-670 and A. El-Baz, A. Farag, G. Gimel'farb, R. Falk, M. Abou El-Ghar, T. Eldiasty, "A framework for automatic segmentation of lung nodules from low dose chest CT scans," Proceedings of the IAPR International Conference on Pattern Recognition (ICPR'06), Hong Kong, vol. 3, Aug. 20-24, 2006, pp. 611-614, both of which are incorporated by reference herein. As disclosed therein, the prior appearance can be modeled with a translation and rotation invariant MGRF with pairwise interaction of voxel intensities. The MGRF is analytically identified from a set of training nodules. Visual appearance of the nodules and their background at each current step of evolution can also be represented with a mixed marginal probability distribution of voxel intensities in chest images to be modeled with the LCDG models.

Other techniques may be used to segment nodules from the registered LDCT scans. Therefore the invention is not limited to the particular techniques disclosed herein.

Quantification of Volumetric Changes

Once the nodules have been extracted from the segmented and registered lung tissue image data, the volumetric changes in the nodules can be quantified by calculating the volume of each extracted nodule in each LDCT scan, and comparing the calculated volumes to determine an amount of volumetric change. It will be appreciated that various manners of representing the volumetric change, e.g., absolute values, relative values, percentages, etc. may be used consistent with the invention. It will also be appreciated that calculating the volume of a segmented nodule from LDCT image data is well within the abilities of one of ordinary skill in the art having the benefit of the instant disclosure. In addition, the invention is not limited to any particular calculation or representation of volume or volumetric change as is disclosed herein.

Conclusion

Embodiments consistent with the invention therefore provide improved automated diagnosis of lung cancer through tracking of the growth rate of pulmonary nodules to detect high growth rate nodules that are indicative of malignancy. Various modifications may be made to the illustrated embodiments without departing from the spirit and scope of the invention. For example, it will be appreciated that lung segmentation may be implemented separately from lung registration and vice versa.

In addition, lung segmentation may be performed in connection with medical diagnostic processes other than nodule growth detection processes. For example, lung segmentation may be used in connection with a nodule detection process to segment lung tissue from an LDCT image prior to detecting nodules in the images. In addition, the segmentation techniques may also be used in connection with segmenting anatomical structures other than lung tissue from LDCT images, as well as in connection with segmenting anatomical structures from images other than LDCT images. The herein-described segmentation technique may also be used for segmentation of a 3D cerebrovascular system from phase contrast (PC) magnetic resonance angiography (MRA) data in connection with diagnostics and treatment of intracranial vascular disease. As such, the segmentation techniques disclosed herein have applicability in other applications for segmenting anatomical structures from various types of medical image data.

In addition, the registration techniques disclosed herein may be used in connection with registering anatomical structures other than lung tissue from LDCT images, as well as in connection with registering anatomical structures from images other than LDCT images. For example, the disclosed registration techniques may be used to compensate kidney motions in an image-based CAD system for automatic detection of kidney renal rejection on dynamic-contrast enhanced MRI images (DCE-MRI).

Furthermore, the growth detection process disclosed herein may have applicability in applications other than detecting the growth rate of pulmonary nodules. In particular, alternatively embodiments may detect the change in volume of other anatomical structures disposed within defined objects in a body, e.g., by receiving first and second image data sets generated at first and second times, respectively, each of the first and second image data sets including image data for an anatomical structure disposed within a region; determining a location of the anatomical structure in at least one of the first and second image data sets; segmenting image data associated with the region from each of the first and second image data sets; registering the segmented image data associated with the region from the first and second image data sets by performing a global alignment and thereafter performing a local alignment; segmenting image data associated with the anatomical structure from the registered and segmented image data associated with the object from the first and second image data sets; and determining a volumetric change for the anatomical structure between the first and second image data sets using the segmented image data associated with the anatomical structure from the first and second image data sets. For instance, an anatomical structure may be a tumor or other growth, and an object may be a cavity or organ within which the tumor or other growth is disposed. As one example, the herein-described process may be used to detect the progress of cancer treatment, e.g., by tracking the growth of a cancerous tumor over the course of the treatment. Other applications will be apparent to one of ordinary skill in the art having the benefit of the instant disclosure.

Other modifications will be apparent to one of ordinary skill in the art. Therefore, the invention lies in the claims hereinafter appended.

What is claimed is:

1. A method of detecting growth of a pulmonary nodule, the method comprising:
   receiving first and second chest scans generated at first and second times, respectively;
   determining a location of a pulmonary nodule in image data from at least one of the first and second chest scans;
   segmenting image data associated with lung tissue from each of the first and second chest scans;
   using at least one processor, registering the segmented image data associated with the lung tissue from the first and second chest scans by performing a global alignment and thereafter performing a local alignment to compensate for local lung deformations, wherein the global and local alignments are performed in a Gibbs energy domain;
   segmenting image data associated with the pulmonary nodule from the registered and segmented image data associated with the lung tissue from the first and second chest scans; and
   determining a volumetric change for the pulmonary nodule between the first and second chest scans using the segmented image data associated with the pulmonary nodule from the first and second chest scans.

2. The method of claim 1, wherein segmenting the image data associated with the lung tissue includes, for each of the first and second chest scans, segmenting the image data associated with the lung tissue by modeling both a spatial interaction between lung tissue voxels and an intensity distribution for the lung tissue voxels.

3. The method of claim 2, wherein modeling both the spatial interaction between the lung tissue voxels and the intensity distribution for the lung tissue voxels includes:
estimating marginal density for the lung tissue using a Linear Combination of Discrete Gaussians (LCDG) model having positive and negative components;
generating an initial segmentation for the lung tissue from the LCDG model;
estimating spatial interaction parameters for a Markov Gibbs Random Field (MGRF) model; and
refining the initial segmentation for the lung tissue using the LCDG model and the MGRF model.

4. The method of claim 1, wherein registering the segmented image data associated with the lung tissue includes:
transforming the segmented image data associated with the lung tissue from the first and second chest scans to a Gibbs energy domain;
performing a global alignment of the segmented image data associated with the lung tissue from the first and second chest scans using an affine translation that maximizes Gibbs energy; and
after performing the global alignment, performing a local alignment of the segmented image data associated with the lung tissue from the first and second chest scans by matching iso-surfaces generated for the segmented image data associated with the lung tissue from the first and second chest scans based on Gibbs energy.

5. The method of claim 1, wherein the first and second chest scans each include a plurality of low dose computed tomography (LDCT) images.

6. An apparatus, comprising:
at least one processor; and
program code configured to be executed by the at least one processor to detect growth of a pulmonary nodule by receiving first and second chest scans generated at first and second times, respectively, determining a location of a pulmonary nodule in image data from at least one of the first and second chest scans, segmenting image data associated with lung tissue from each of the first and second chest scans, registering the segmented image data associated with the lung tissue from the first and second chest scans by performing a global alignment and thereafter performing a local alignment to compensate for local lung deformations, segmenting image data associated with the pulmonary nodule from the registered and segmented image data associated with the lung tissue from the first and second chest scans, and determining a volumetric change for the pulmonary nodule between the first and second chest scans using the segmented image data associated with the pulmonary nodule from the first and second chest scans, wherein the global and local alignments are performed in a Gibbs energy domain.

7. A program product, comprising:
a non-transitory computer readable storage medium; and
program code stored on the computer readable storage medium and configured upon execution to detect growth of a pulmonary nodule by receiving first and second chest scans generated at first and second times, respectively, determining a location of a pulmonary nodule in image data from at least one of the first and second chest scans, segmenting image data associated with lung tissue from each of the first and second chest scans, registering the segmented image data associated with the lung tissue from the first and second chest scans by performing a global alignment and thereafter performing a local alignment to compensate for local lung deformations, segmenting image data associated with the pulmonary nodule from the registered and segmented image data associated with the lung tissue from the first and second chest scans, and determining a volumetric change for the pulmonary nodule between the first and second chest scans using the segmented image data associated with the pulmonary nodule from the first and second chest scans, wherein the global and local alignments are performed in a Gibbs energy domain.

8. A method of detecting volumetric change in an anatomical structure, the method comprising:
receiving first and second image data sets generated at first and second times, respectively, each of the first and second image data sets including image data for an anatomical structure disposed within a region;
determining a location of the anatomical structure in at least one of the first and second image data sets;
segmenting image data associated with the region from each of the first and second image data sets;
using at least one processor, registering the segmented image data associated with the region from the first and second image data sets by performing a global alignment and thereafter performing a local alignment, wherein the global and local alignments are performed in a Gibbs energy domain;
segmenting image data associated with the anatomical structure from the registered and segmented image data associated with the region from the first and second image data sets; and
determining a volumetric change for the anatomical structure between the first and second image data sets using the segmented image data associated with the anatomical structure from the first and second image data sets.

9. The method of claim 8, wherein the region is a lung or a pair of lungs, and wherein the anatomical structure is a pulmonary nodule.

10. The method of claim 8, wherein registering the segmented image data associated with the region includes:
transforming the segmented image data associated with the region from the first and second image data sets to a Gibbs energy domain;
performing a global alignment of the segmented image data associated with the region from the first and second image data sets using an affine translation that maximizes Gibbs energy; and
after performing the global alignment, performing a local alignment of the segmented image data associated with the region from the first and second image data sets by matching iso-surfaces generated for the segmented image data associated with the region from the first and second image data sets based on Gibbs energy.

11. A method of detecting growth of a pulmonary nodule, the method comprising:
receiving first and second chest scans generated at first and second times, respectively;
determining a location of a pulmonary nodule in image data from at least one of the first and second chest scans;
segmenting image data associated with lung tissue from each of the first and second chest scans, wherein segmenting the image data associated with the lung tissue includes, for each of the first and second chest scans, segmenting the image data associated with the lung tissue by modeling both a spatial interaction between lung tissue voxels and an intensity distribution for the lung tissue voxels, wherein modeling both the spatial interaction between the lung tissue voxels and the intensity distribution for the lung tissue voxels includes:

estimating marginal density for the lung tissue using a Linear Combination of Discrete Gaussians (LCDG) model having positive and negative components;
generating an initial segmentation for the lung tissue from the LCDG model;
estimating spatial interaction parameters for a Markov Gibbs Random Field (MGRF) model; and
refining the initial segmentation for the lung tissue using the LCDG model and the MGRF model;
using at least one processor, registering the segmented image data associated with the lung tissue from the first and second chest scans by performing a global alignment and thereafter performing a local alignment;
segmenting image data associated with the pulmonary nodule from the registered and segmented image data associated with the lung tissue from the first and second chest scans; and
determining a volumetric change for the pulmonary nodule between the first and second chest scans using the segmented image data associated with the pulmonary nodule from the first and second chest scans.

12. The method of claim 11, wherein registering the segmented image data associated with the lung tissue includes:
transforming the segmented image data associated with the lung tissue from the first and second chest scans to a Gibbs energy domain;
performing a global alignment of the segmented image data associated with the lung tissue from the first and second chest scans using an affine translation that maximizes Gibbs energy; and
after performing the global alignment, performing a local alignment of the segmented image data associated with the lung tissue from the first and second chest scans by matching iso-surfaces generated for the segmented image data associated with the lung tissue from the first and second chest scans based on Gibbs energy.

13. A method of detecting growth of a pulmonary nodule, the method comprising:
receiving first and second chest scans generated at first and second times, respectively;
determining a location of a pulmonary nodule in image data from at least one of the first and second chest scans;
segmenting image data associated with lung tissue from each of the first and second chest scans;
using at least one processor, registering the segmented image data associated with the lung tissue from the first and second chest scans by performing a global alignment and thereafter performing a local alignment, wherein registering the segmented image data associated with the lung tissue includes:
transforming the segmented image data associated with the lung tissue from the first and second chest scans to a Gibbs energy domain;
performing a global alignment of the segmented image data associated with the lung tissue from the first and second chest scans using an affine translation that maximizes Gibbs energy; and
after performing the global alignment, performing a local alignment of the segmented image data associated with the lung tissue from the first and second chest scans by matching iso-surfaces generated for the segmented image data associated with the lung tissue from the first and second chest scans based on Gibbs energy;
segmenting image data associated with the pulmonary nodule from the registered and segmented image data associated with the lung tissue from the first and second chest scans; and
determining a volumetric change for the pulmonary nodule between the first and second chest scans using the segmented image data associated with the pulmonary nodule from the first and second chest scans.

14. The method of claim 13, wherein segmenting the image data associated with the lung tissue includes, for each of the first and second chest scans, segmenting the image data associated with the lung tissue by modeling both a spatial interaction between lung tissue voxels and an intensity distribution for the lung tissue voxels.

15. An apparatus, comprising:
at least one processor; and
program code configured to be executed by the at least one processor to detect growth of a pulmonary nodule by receiving first and second chest scans generated at first and second times, respectively, determining a location of a pulmonary nodule in image data from at least one of the first and second chest scans, segmenting image data associated with lung tissue from each of the first and second chest scans, registering the segmented image data associated with the lung tissue from the first and second chest scans by performing a global alignment and thereafter performing a local alignment, segmenting image data associated with the pulmonary nodule from the registered and segmented image data associated with the lung tissue from the first and second chest scans, and determining a volumetric change for the pulmonary nodule between the first and second chest scans using the segmented image data associated with the pulmonary nodule from the first and second chest scans, wherein the program code is configured to register the segmented image data associated with the lung tissue by:
transforming the segmented image data associated with the lung tissue from the first and second chest scans to a Gibbs energy domain;
performing a global alignment of the segmented image data associated with the lung tissue from the first and second chest scans using an affine translation that maximizes Gibbs energy; and
after performing the global alignment, performing a local alignment of the segmented image data associated with the lung tissue from the first and second chest scans by matching iso-surfaces generated for the segmented image data associated with the lung tissue from the first and second chest scans based on Gibbs energy.

16. The apparatus of claim 15, wherein the program code is configured to segment the image data associated with the lung tissue by, for each of the first and second chest scans, segmenting the image data associated with the lung tissue by modeling both a spatial interaction between lung tissue voxels and an intensity distribution for the lung tissue voxels.

17. The apparatus of claim 16, wherein the program code is configured to model both the spatial interaction between the lung tissue voxels and the intensity distribution for the lung tissue voxels by:
estimating marginal density for the lung tissue using a Linear Combination of Discrete Gaussians (LCDG) model having positive and negative components;
generating an initial segmentation for the lung tissue from the LCDG model;

estimating spatial interaction parameters for a Markov Gibbs Random Field (MGRF) model; and refining the initial segmentation for the lung tissue using the LCDG model and the MGRF model.

18. A program product, comprising:
a non-transitory computer readable storage medium; and
program code stored on the computer readable storage medium and configured upon execution to detect growth of a pulmonary nodule by receiving first and second chest scans generated at first and second times, respectively, determining a location of a pulmonary nodule in image data from at least one of the first and second chest scans, segmenting image data associated with lung tissue from each of the first and second chest scans, registering the segmented image data associated with the lung tissue from the first and second chest scans by performing a global alignment and thereafter performing a local alignment, segmenting image data associated with the pulmonary nodule from the registered and segmented image data associated with the lung tissue from the first and second chest scans, and determining a volumetric change for the pulmonary nodule between the first and second chest scans using the segmented image data associated with the pulmonary nodule from the first and second chest scans, wherein the program code is configured to register the segmented image data associated with the lung tissue by:
transforming the segmented image data associated with the lung tissue from the first and second chest scans to a Gibbs energy domain;
performing a global alignment of the segmented image data associated with the lung tissue from the first and second chest scans using an affine translation that maximizes Gibbs energy; and
after performing the global alignment, performing a local alignment of the segmented image data associated with the lung tissue from the first and second chest scans by matching iso-surfaces generated for the segmented image data associated with the lung tissue from the first and second chest scans based on Gibbs energy.

19. The program product of claim 18, wherein the program code is configured to segment the image data associated with the lung tissue by, for each of the first and second chest scans, segmenting the image data associated with the lung tissue by modeling both a spatial interaction between lung tissue voxels and an intensity distribution for the lung tissue voxels.

20. The program product of claim 19, wherein the program code is configured to model both the spatial interaction between the lung tissue voxels and the intensity distribution for the lung tissue voxels by:
estimating marginal density for the lung tissue using a Linear Combination of Discrete Gaussians (LCDG) model having positive and negative components;
generating an initial segmentation for the lung tissue from the LCDG model;
estimating spatial interaction parameters for a Markov Gibbs Random Field (MGRF) model; and
refining the initial segmentation for the lung tissue using the LCDG model and the MGRF model.

21. An apparatus, comprising:
at least one processor; and
program code configured to be executed by the at least one processor to detect volumetric change in an anatomical structure by receiving first and second image data sets generated at first and second times, respectively, each of the first and second image data sets including image data for an anatomical structure disposed within a region, determining a location of the anatomical structure in at least one of the first and second image data sets, segmenting image data associated with the region from each of the first and second image data sets, registering the segmented image data associated with the region from the first and second image data sets by performing a global alignment and thereafter performing a local alignment, segmenting image data associated with the anatomical structure from the registered and segmented image data associated with the region from the first and second image data sets, and determining a volumetric change for the anatomical structure between the first and second image data sets using the segmented image data associated with the anatomical structure from the first and second image data sets, wherein the global and local alignments are performed in a Gibbs energy domain.

22. The apparatus of claim 21, wherein the region is a lung or a pair of lungs, and wherein the anatomical structure is a pulmonary nodule.

23. The apparatus of claim 21, wherein the program code is configured to register the segmented image data associated with the region by:
transforming the segmented image data associated with the region from the first and second image data sets to a Gibbs energy domain;
performing a global alignment of the segmented image data associated with the region from the first and second image data sets using an affine translation that maximizes Gibbs energy; and
after performing the global alignment, performing a local alignment of the segmented image data associated with the region from the first and second image data sets by matching iso-surfaces generated for the segmented image data associated with the region from the first and second image data sets based on Gibbs energy.

24. A program product, comprising:
a non-transitory computer readable storage medium; and
program code stored on the computer readable storage medium and configured upon execution to detect volumetric change in an anatomical structure by receiving first and second image data sets generated at first and second times, respectively, each of the first and second image data sets including image data for an anatomical structure disposed within a region, determining a location of the anatomical structure in at least one of the first and second image data sets, segmenting image data associated with the region from each of the first and second image data sets, registering the segmented image data associated with the region from the first and second image data sets by performing a global alignment and thereafter performing a local alignment, segmenting image data associated with the anatomical structure from the registered and segmented image data associated with the region from the first and second image data sets, and determining a volumetric change for the anatomical structure between the first and second image data sets using the segmented image data associated with the anatomical structure from the first and second image data sets, wherein the global and local alignments are performed in a Gibbs energy domain.

25. The program product of claim 24, wherein the region is a lung or a pair of lungs, and wherein the anatomical structure is a pulmonary nodule.

26. The program product of claim 24, wherein the program code is configured to register the segmented image data associated with the region by:

transforming the segmented image data associated with the region from the first and second image data sets to a Gibbs energy domain;

performing a global alignment of the segmented image data associated with the region from the first and second image data sets using an affine translation that maximizes Gibbs energy; and after performing the global alignment, performing a local alignment of the segmented image data associated with the region from the first and second image data sets by matching iso-surfaces generated for the segmented image data associated with the region from the first and second image data sets based on Gibbs energy.

* * * * *